FACSIMILE ALARM CIRCUIT

INVENTORS
GEORGE T. SHIMABUKURO
WALDEMAR SAEGER
BY Anthony D. Cennamo
Daniel Rubin
ATTORNEYS May 13, 1969 G. T. SHIMABUKURO ET AL 3,444,315

FACSIMILE ALARM CIRCUIT

Filed Oct. 1, 1965 Sheet 9 of 13

FACSIMILE ALARM CIRCUIT

May 13, 1969 G. T. SHIMABUKURO ET AL 3,444,315

FACSIMILE ALARM CIRCUIT

Filed Oct. 1, 1965 Sheet 13 of 13

United States Patent Office 3,444,315
Patented May 13, 1969

3,444,315

FACSIMILE ALARM CIRCUIT

George T. Shimabukuro, Monterey Park, and Waldemar Saeger, La Canada, Calif., assignors to Xerox Corporation, Rochester, N.Y., a corporation of New York Filed Oct. 1, 1965, Ser. No. 492,155
Int. Cl. H04n 7/02; H04l 7/00
U.S. Cl. 178—6 3 Claims

ABSTRACT OF THE DISCLOSURE

In a facsimile system including transmitter and receiver stations, alarm means for detecting a predetermined malfunction at said transmitter or receiver, respectively and also including means for signaling the detected malfunction to the other station.

This invention relates to facsimile equipment and more particularly to facsimile transceivers adapted to operate through the direct distance dialing telephone network either with or without direct electrical connection thereto.

Facsimile transmission is old in the art. In the past, it has mostly been used for transmitting photographic type of information over predetermined leased transmission channels. More recently, equipment has been marketed for the high speed transmission of documents over broad band transmission channels. The present invention is particularly concerned with the economical and flexible transmission of letters, drawings and other black-white documents over ordinary voice grade telephone channels.

The equipment meeting these goals should be inexpensive and the invention accordingly, provides a facsimile transceiver wherein many of the components are shared between the transmitting and receiving function, instead of a separate transmitter and receiver.

It is desirable that the equipment be capable of transmitting documents any location where telephones are available. The invention provides a facsimile transceiver which is capable of either transmitting or receiving documents through any conventional telephone set without requiring an electrical connection thereto. The invention provides a facsimile transceiver capable of establishing synchronism with a like transceiver at a remote location independently of the character, frequency, or phase of the power line to which each may be connected.

The equipment should minimize the telephone charges associated with the transmission of the document. The invention provides equipment which does not require the operator to lease a so-called data set from the telephone company, which transmits documents in a shorter time than has heretofore been possible, and which permits the equipment operators at each end of the transmission link to terminate the telephone connection as soon as the connection is no longer actually needed or whenever transmission becomes unintelligible.

The equipment should also be capable of operating through telephone company data sets where available, to take advantage of their improved transmission capability. The invention provides a facsimile transceiver which operates with two level signals which will interface with a conventional data set intended for the transmission of digital signals through telephone lines.

The equipment should function reliably without regard to the skill of the operator. The invention provides a facsimile transceiver which requires only the insertion of a piece of paper and the dialing of a telephone call in order to provide high quality facsimile transmission.

Specific objectives will become apparent in connection with a more detailed description of the invention and the drawings related thereto.

Figure 1:
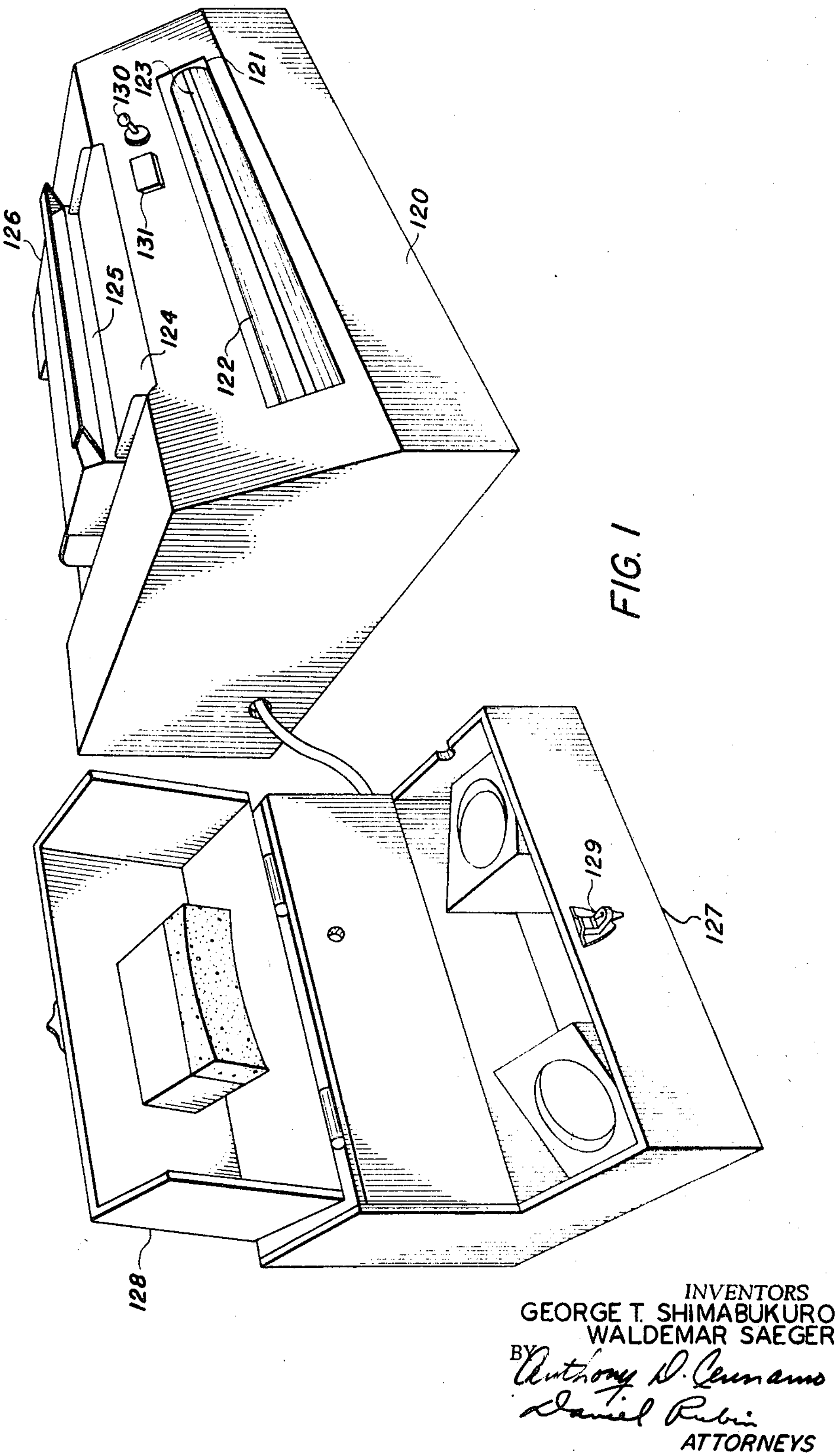
FIGURE 1 is an exterior view of a facsimile transceiver according to the invention.

FIGURE 1 shows the external appearance of a form of facsimile transceiver according to the invention. The apparatus is enclosed by a cabinet 120 including a generally horizontal aperture 121 in its forwardly facing surface. Visible within the aperture is a rotatable drum 122 including a clamp bar 123. Aperture 121 permits access to the drum so that an operator may fasten a sheet of paper to the drum to make a facsimile recording thereon. On top of the cabinet is a tray 124 for holding a document to be transmitted and feeding it through a slot 125 into the scanner mechanism 126. Cabinet 120 also includes a reset button 130 and an indicator light 131. Adjacent to the cabinet 120 and connected thereto is a box 127 which is adapted to contain a standard telephone hand set and is provided with a hinged cover 128 and latch 129.

Figure 2:
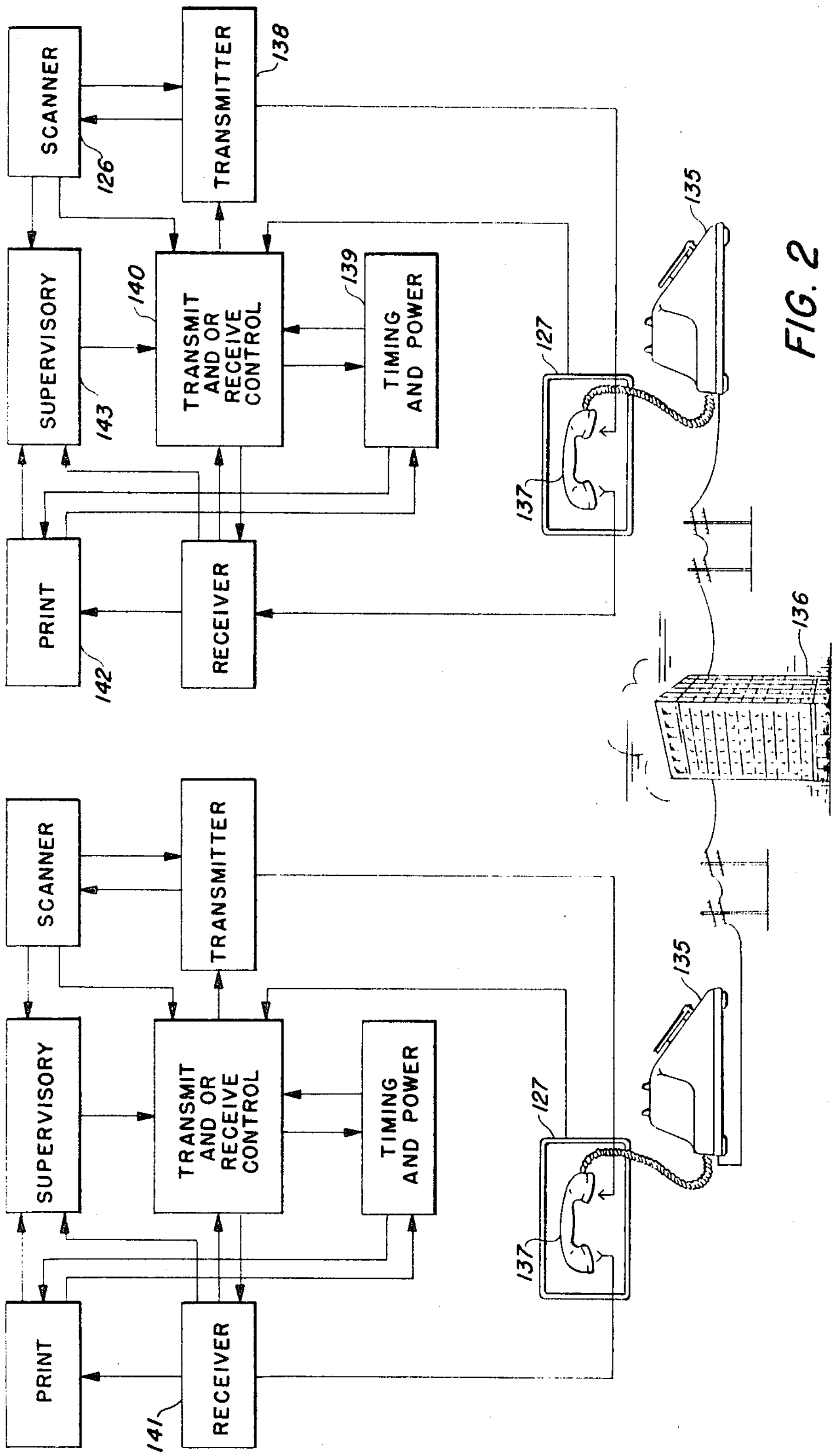
FIGURE 2 is a block diagram illustrating the functions of the invention.

FIGURE 2 is a schematic diagram showing, in general terms, how two of the facsimile transceivers of FIGURE 1, each at a different location, may be interconnected to form a bidirectional facsimile system. It should be understood however, that the functional blocks shown in FIGURE 2 correspond in only a very general way to the circuits or circuit functions described in subsequent figures. The first step in sending a document is for the operator at one location to use his telephone 135 to dial the corresponding telephone 135 at the other location, generally through one or more intervening telephone exchanges 136. After a normal voice connection has been confirmed by the operator at each piece of equipment, each operator places his handset 137 in box 127 and closes the cover. Either operator inserts a document through slot 125 into the scanner 126 of his unit. Scanner 126 then sends a control signal to transmit/receive circuit 140 which, responsive to the document in scanner 126 and the handset in box 127, adapts the transceiver to the transmit mode. Scanner 126 also sends video signals to transmitter 138 which processes the signals and uses them to control the operation of scanner 126. Meanwhile, transmitter 138 combines the video signals with control signals from transmit/receive circuit 140 and introduces them into handset 137 from which they are transmitted over the telephone line. At the same time, even though transmitting is taking place, timing and power circuit 139 is exchanging signals with printer 142 and generating further signals for processing by transmit/receive circuit 140.

At the other transceiver a signal is picked up from the corresponding handset 137 and detected by receiver 141 which causes transmit/receive circuit 140 to put the transceiver into the receive mode. The received signals also cause transmit/receive circuit 140 to control the operation of timing and power circuit 139 so as to bring printer 142 into synchronism with scanner 126 of the transmitting transceiver. The received signals are applied to printer 142 and cause it to record a facsimile of the transmitted document.

At each transceiver a supervisory circuit 143 monitors the operation of the various circuits so that a corresponding alarm sounds at each of the two transceivers when a transmission is either completed or interrupted. The alarm signals each of the two operators to lift up their handsets and talk to each other to determine whether documents are to be retransmitted, more documents are to be transmitted in either direction, or whether the telephone connection should be terminated.

It is obvious from the preceding description that an unlimited number of facsimile transceivers according to the invention may be used in connection with each other, since any one can be functionally connected with any other, for either transmitting or receiving, through the conventional switching facilities of the telephone companies. Conference call arrangements may also be used to permit one transceiver to simultaneously transmit to a number of others.

Figure 3:
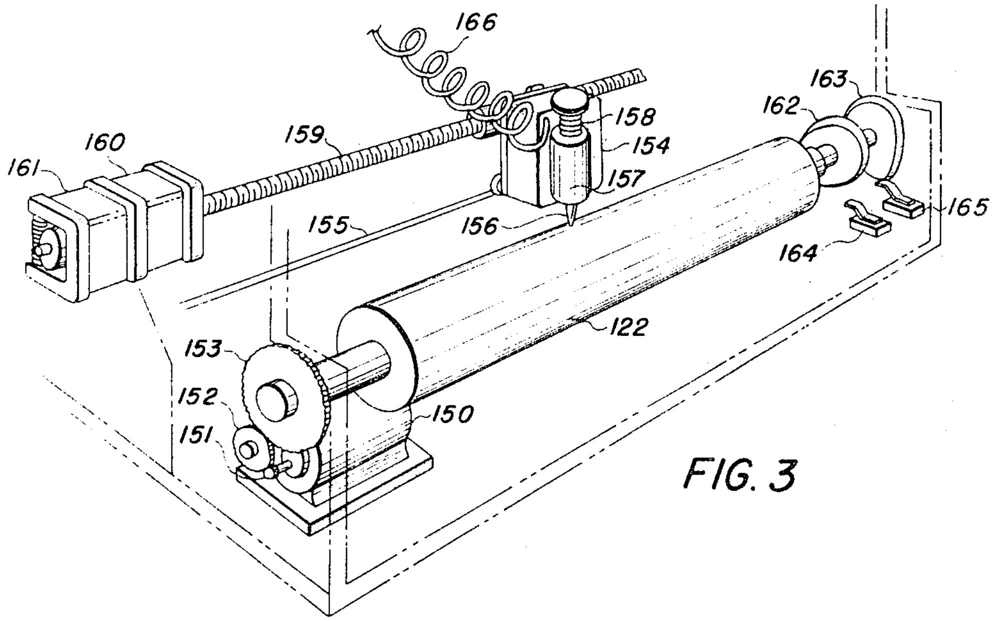
FIGURE 3 is a simplified isometric view of the recording mechanism.

FIGURE 3 is a simplified isometric view of the printing or recording mechanism. Drum 122 is journaled for rotation in bearings, not shown, and is driven through gears 151, 152 and 153 by motor 150 which is preferably, although not necessarily a two pole synchronous motor with means, for example a permanent magnet rotor for providing a predictable relationship between electrical power phase and rotational phase. Motor 150 bears a pinion 151 which drives idler gear 152 at a 2 to 1 reduction ratio, and idler gear 152 drives drum gear 153 at a 10 to 1 reduction ratio. Attached to drum 122 are a pair of cams 162 and 163 which actuate switches 164 and 165 respectively. The functions of these switches will be described subsequently in connection with a description of FIGURES 6 and 12. A pen carriage 154 is located adjacent to drum 122 and slideably mounted on rails 155 which are parallel to each other and to drum 122. The pen carriage 154 carries a marking tip 156 which may be urged into contact with the drum by an electromagnetic assembly 157 and urged away from the drum by spring 158. A flexible electrical cable 166 carries control voltages to the electromagnet assembly 157 and to marking tip 156 itself. The pen carriage 154 also engages a lead screw 159 which is incrementally driven by either a forward stepping motor 160 or reverse stepping motor 161, the two stepping motors being connected to each other and to the lead screw. In this manner, marking tip 156 can be advanced in uniform discrete increments on the order of 0.01 inch in a direction parallel to the axis of the drum in response to commands derived from circuitry which will be described later on.

Marking tip 156 may take many different forms as is known in the art. It may comprise an electrically insulated metal stylus adapted to write directly upon conventional electrolytic facsimile recording paper. The same form of stylus can be used to deposit electrostatic charge on an insulating sheet for subsequent development by known xerographic techniques. A simple metal stylus can also be used to record directly on pressure sensitive recording paper through selective energization of electromagnet assembly 157. Various forms of apparatus for the selective deposition of liquid ink may be employed. A variable intensity focused light source may also be employed for forming a latent image on a sheet of photographic paper or the like. Any of these methods or any other suitable facsimile recording technique may be employed with the invention.

Figure 4:
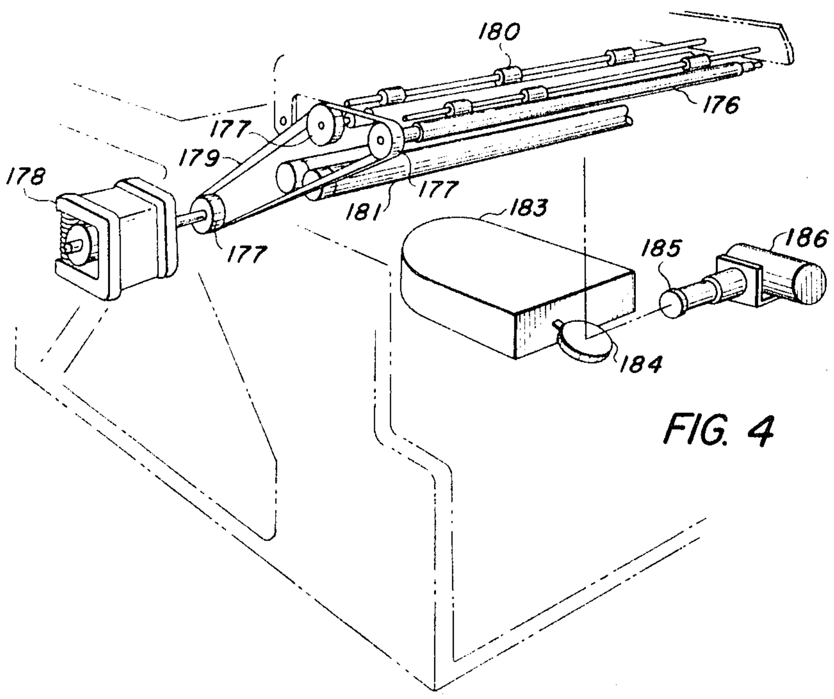
FIGURE 4 is a simplified isometric view of the transmitting mechanism.
Figure 5A:
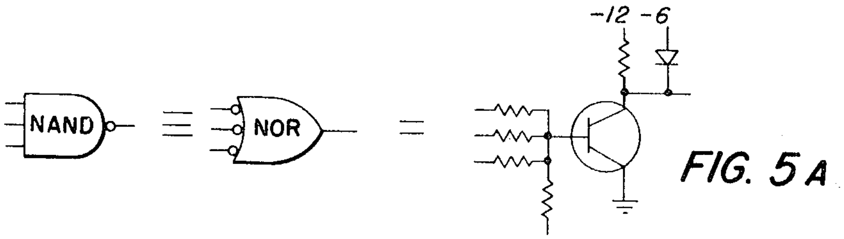
FIGURE 5 illustrates logical circuit elements used in the subsequent figures.
Figure 5B:
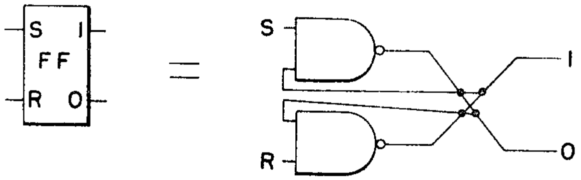
Figure 5C:
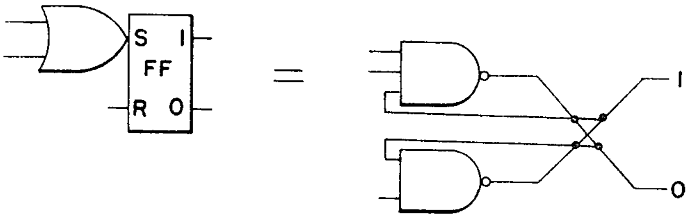
Figure 5D:
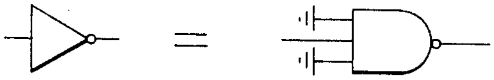
Figure 5E:
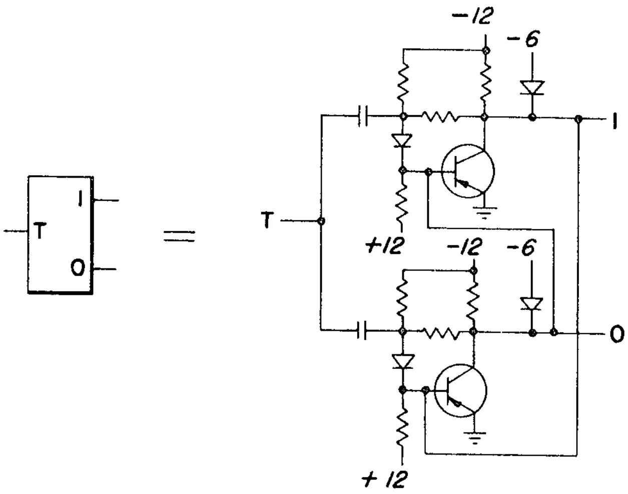

FIGURE 4 is a simplified isometric view of a form of scanning mechanism 126. A pair of drive rolls 176 is provided with cog wheels 177, as is a stepping motor 178 which may be identical with motor 160 or 161 of FIGURE 3. Motor 178 incrementally drives rolls 176 through a so-called "timing" or cogged belt 179. Each drive roll 176 cooperates with a pinch roller 180 immediately above it to feed a sheet of paper through the scanner in increments on the order of 0.01 inch. Fluorescent lamps 181, preferably operated by direct current, are positioned beneath drive rolls 176 and are provided with reflectors, not shown in this figure, to direct light upwardly against the lower surface of a sheet of paper passing through the rolls, and supported on a slit-containing platen, also not shown in this figure. A mirror galvanometer 183, including a small mirror 184, samples light reflected from the sheet of paper and passes it through lens 185 to photomultiplier 186 or other photosensitive device. Since the mirror galvanometer is a device adapted to rotationally oscillate the mirror about an axis, the photomultiplier 186 is enabled to scan a sampling spot back and forth in a line across a document or other sheet of paper passing through the drive rolls.

FIGURE 5 illustrates certain forms of elementary logic circuits which are widely used in subsequent figures of this specification. FIGURE 5A shows the NAND and NOR gate symbols and a suitable transistor circuit for realizing the function represented by the symbols. The illustrated NAND and NOR symbols actually denote the same circuit function, as shown, for example, in MIL-STD-806B, Feb. 26, 1962. In terms of the illustrated transistor circuit, the symbols represent the following function: the output voltage is minus 6 volts if, and only if, all inputs are at zero volts, otherwise the output is at zero volts. It is convenient to regard most of the gates in later figures as NAND gates with "1" equal to zero volts and "0" equal to minus 6 volts. FIGURE 5B shows how two of the circuits of FIGURE 5A can be cross-coupled to provide a flip-flop circuit. The flip-flop is characterized in that it will change state only when an input voltage of minus 6 volts is applied to the appropriate input terminal. Specifically, if minus 6 volts is applied to the "Reset" input, then the flip-flop will be "Set," i.e., the "1" output will be at zero volts and the "0" output will be at minus 6 volts. FIGURE 5C shows an obvious and self-explanatory modification of FIGURE 5B in which the flip-flop can be set to one of its states by a voltage of minus 6 volts applied to either of two corresponding inputs. FIGURE 5D shows how an "inverter" function is provided by the logic gate of FIG. 5A. FIGURE 5E shows a trigger flip-flop which changes state as a result of a pulse applied to the single input terminal. In the form used in this specification, the input signal is a six volt positive going pulse and the output voltages are either zero or minus 6 volts. The illustrated transistor embodiments of the described circuit functions can be obtained in module form from the Engineered Electronics Company of Santa Ana, Calif. The NAND/NOR circuit is their model Q-411 or Q-421 and the circuit of 5B represents two models Q-412 or Q-422.

The symbols and circuits of FIGURE 5 represent those chosen for use in the illustrative embodiment of the invention. The functions represented by the logic symbols can be realized by circuits of many forms obtainable from numerous manufacturers and all of which are well known in the art. Those skilled in the art will also realize that logical circuitry of the type to be shown in subsequent figures has a certain overall input-output relation which can be duplicated using different arrangements of the same basic logical elements and furthermore, that this function can be realized using quite different types of logic elements which need not even be electronic. Merely as an illustration it may be noted that AND/OR gates may be substituted for the illustrated NAND/NOR gates and that it might even be possible thereby to simplify the described embodiment of the invention. In general, the designer will choose the type and design of his logical building blocks based on such considerations as cost, size, reliability, voltage and current requirements, speed, fan-in and fan-out capabilities, etc.

Timing circuits

Figure 6:
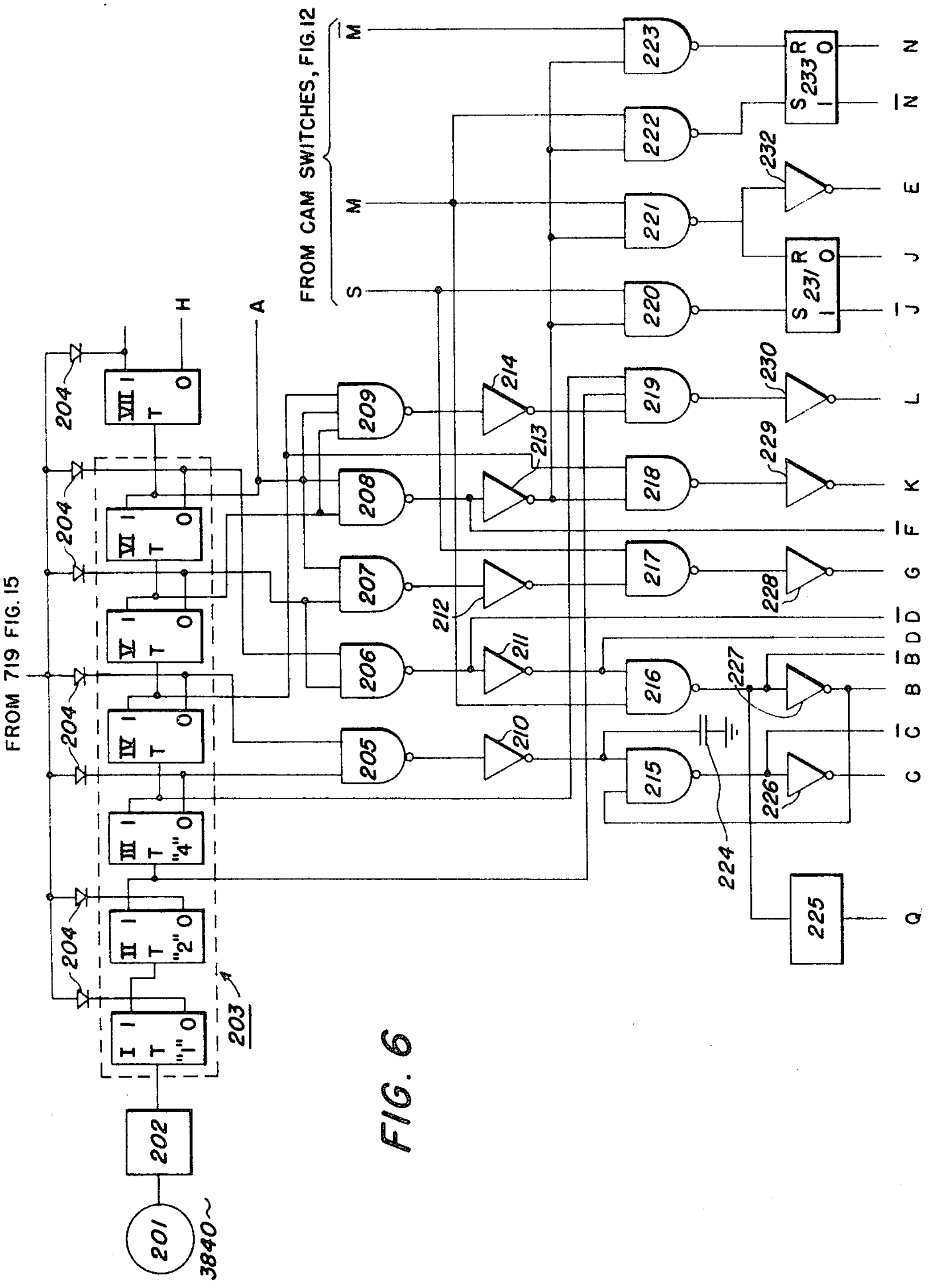
FIGURE 6 shows the basic timing circuit.
Figure 7:
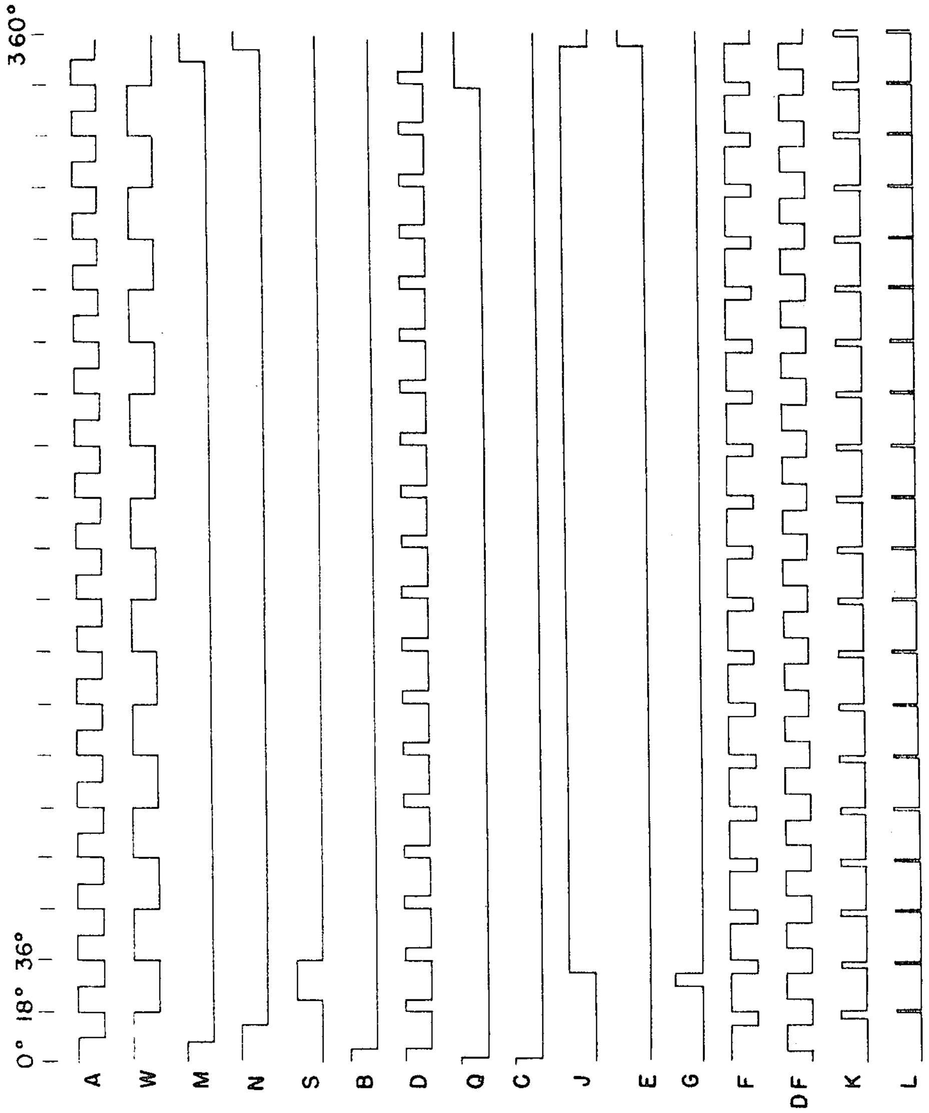
FIGURE 7 shows the repetitive waveforms corresponding to FIGURE 6.
Figure 12:
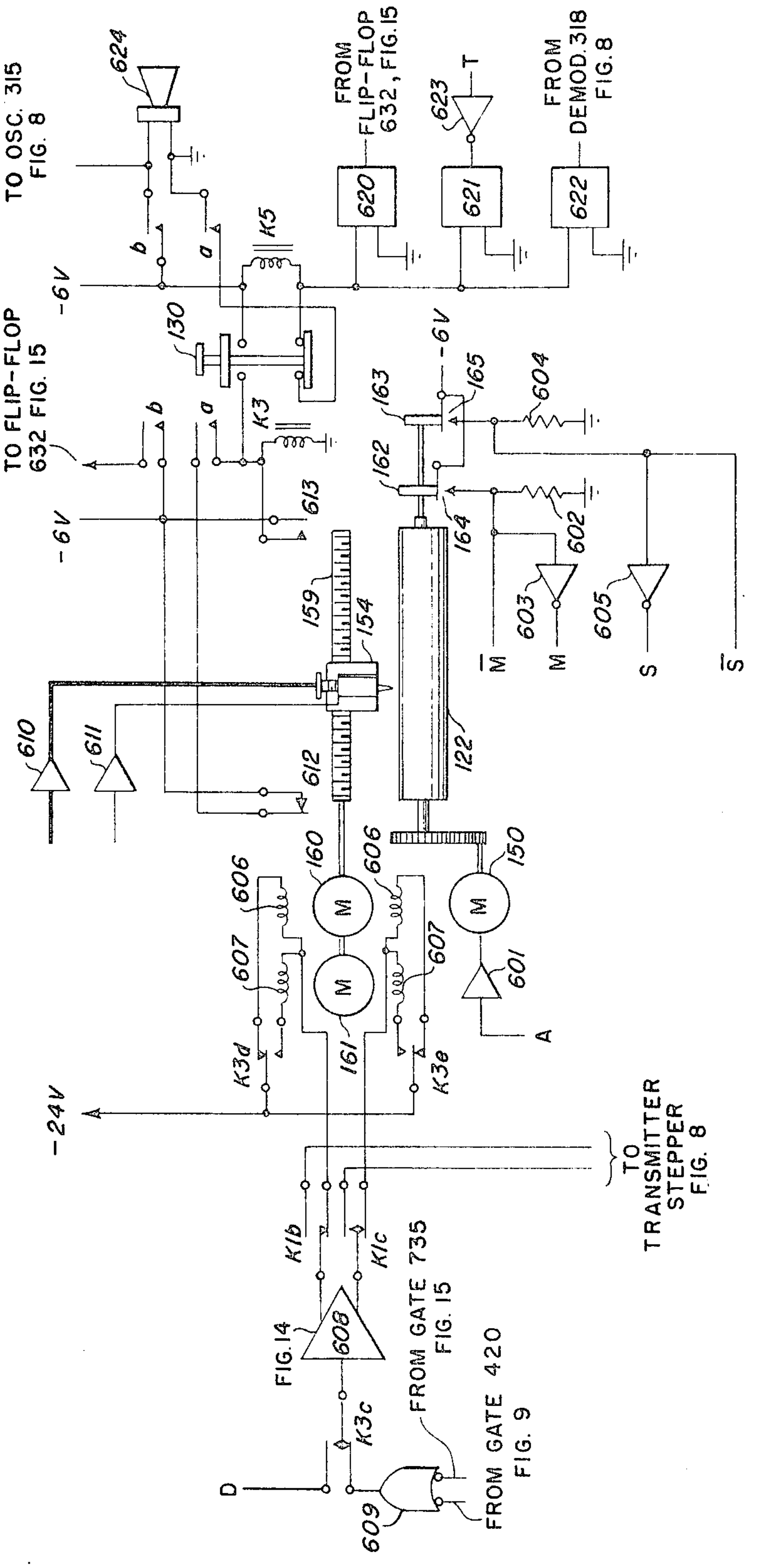
FIGURE 12 shows the printer power and control circuits.
Figure 13:
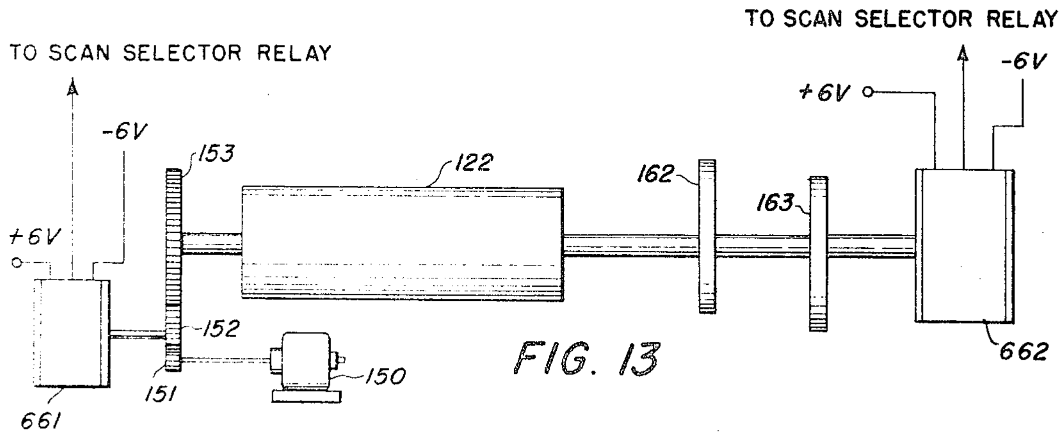
FIGURE 13 shows an alternate form of FIGURE 12.

FIGURE 6 shows the timing circuits used to generate the timing waveforms shown in FIGURE 7, which are used in controlling the operation of the facsimile transceiver. A tuning fork or other stable oscillator 201 provides a 3840 cycle output frequency which is processed by pulse shaping circuit 202 to provide a train of positive-going pulses at the oscillator frequency. These pulses are applied to a counter or divider chain of seven sequentially connected trigger flip-flops identified as I through VII. A higher frequency crystal oscillator with additional dividers may also be employed. For convenience the first six stages only are regarded as constituting a distinct scale of 64 counter 203 and are so shown in the figure. Each counter can be simultaneously reset to zero from a common source through coupling diodes 204, but the reset function will not be described execept in connection with FIGURE 15. The output of stage VI is a 60-cycle square wave identified as signal A which is used to drive motor 150 as shown in FIGURES 3, 12 and 13. The output of stage VII is a 30-cycle square wave H. Motor 150 rotates at 3600 r.p.m. and drives drum 122 at 180 r.p.m. so that one revolution requires 333⅓ milliseconds or 20 cycles of signal A. Drum 122, acting through cams 162 and 163 and switches 164 and 165 generates timing signals M, $\overline{M}$ and S in a manner which will be more fully shown in FIGURE 12. In terms of the rotation of drum 122, signal M is in the zero volt or logical "1" state from 355.5 to 7.5° and S is in the "1" state from 22° to 36°. Signal $\overline{M}$ is simply the inverse of signal M. For reasons which will become apparent later, the otherwise abitrary zero degree position of drum 122 should be chosen at a point where marking tip 156 is over clamp bar 123. Because of the fixed relationship existing between frequency divider 203 and drum 122 it is convenient to use the angular position of drum 122 for specifying the various waveforms generated in FIGURE 6. For convenience it may be noted that in the illustrated embodiment one cycle of oscillator 201 corresponds to .26 millisecond and also corresponds to .28° of rotation of drum 122. Thus, one degree of rotation corresponds to about .93 millisecond.

The "0" outputs of stages III and IV of counter 203 are combined in NAND gate 205, the output of which is inverted by inverter 210, delayed slightly by capacitor 224 and applied to AND gate 215. This signal is in the logical "1" state whenever counter 203 is at counts 0 to 3, 16 to 19, 32 to 35, or 48 to 51. Further processing of this signal will be described later.

The "0" ouputs of stages V and VI of the counter are combined in AND gate 206 and the resulting signal inverted to provide signal D which is in the logical "1" state whenever divider 203 registers counts zero through fifteen, inclusive. This output, accordingly, appears 20 times per revolution at 0° to 4.5°; 18° to 22.5°; 36° to 40.5°, etc. and is referred to as the advance clock signal.

The "0" output of stage V is combined with the "1" output of stage VI in gate 207, the output of which is inverted in inverter 212 to provide a signal which is at the logical "1" level during counts 32 to 47 inclusive. This signal is combined in NAND gate 217 with incoming signal S which is at the "1" level from 22 to 36°. The output of gate 217, inverter by inverter 228, is a signal which is at the logical 1 level from 27° to 31.5° only and is identified as the prevideo signal G.

The "1" outputs of stages V and VI are combined in NAND gate 208 to provide a signal which is at the logical "0" level when counter 203 registers counts 48 to 63 inclusive. This signals is identified as $\overline{F}$ and is in the logical 1 level from 0 to 13.5°; 18° to 31.5°; 36° to 49.5°, etc. This signal is also inverted in inverter 213 to provide a signal which is at the logical "1" level from 13.5° to 18°; 31.5° to 36°, etc. and is used internally as an input to gates 218, 220, 221, 222 and 223. The other input to gate 218 is the "1" input of stage IV. Accordingly, the output of gate 218 is the triple coincidence of counter stages IV, V, VI. This is inverted in inverter 229 to provide a signal which is the logical "1" level for counts 50 to 63 inclusive or 15¾° to 18°; 33¾° to 36°; 51¾° to 54°, etc.

The triple coincidence of the "1" output of stages IV, V, VI is also detected in gate 209, inverted in inverter 214, combined in gate 219 with the "1" outputs of stages II and III and finally, inverted in inverter 230. The resulting signal is accordingly at the logical "1" level for counts 62 through 63 inclusive. This signal is identified as L and appears from 359.4° to 360°; 17.6° to 18°; 35.6° to 36° etc.

The output of inverter 213 is also combined in gate 220 with signal S to produce a minus 6 volt output pulse extending from 31.5° to 36°. This pulse is applied to one input of flip-flop 231. The output of inverter 213 is also combined in gate 221 with signal M to produce a minus 6 volt signal extending from 355.5° to 0°. This pulse is applied to the other input of flip-flop 231. Inasmuch as the flip-flop is alternately set and reset by the signals appearing at its two input terminals, a signal at the appropriate output terminal will be at the logical one level from 31.5° to 355.5°. This signal is designated as video gate signal J. The output of gate 221 is also inverted in inverter 132 to form a signal which is at the logical 1 level from 355.5° to 0° and which is referred to as video end signal E.

The output of inverter 213 is also applied to the first inputs of NAND gates 222 and 223, the outputs of which are connected to opposite input terminals of a flip-flop 233. The second input of gate 222 is connected to the signal M while the second input of gate 223 is connected to the inverse of signal M, namely $\overline{M}$. Thus, flip-flop 233 changes state every time signal M changes state, but the change is delayed in each instance until a logical "1" signal is received from inverter 213. Accordingly, flip-flop 233 changes state at 355.5° and 13.5°, rather than at 352.5° and 7.5°. The output of flip-flop 233, extending from 355.5° to 13.5° is designated signal N.

Returning to the previously described signal D, this signal is combined in gate 216 with signal M which acts as a window to permit only one D signal per revolution to pass through. The resulting signal is inverted by inverter 227 and constitutes a signal B, which is at the logical "1" level from 0° to 4.5° only. The output of gate 216 is also applied to a delay multivibrator circuit 225 which delays it for nearly a full revolution of drum 122 to provide the signal Q shown in FIGURE 7.

Signal B is also combined in gate 215 with the previously described output of inverter 210. The negative output of gate 215 thus extends only from counts 0 to 3 of counter 203 and only at the zero degree position of drum 122. The resulting signal is inverted in inverter 226 to produce a signal designated C which is at the logical "1" level from 0 to 1.13° only.

FIGURE 7 shows the above-described waveforms plus a synthesized waveform $\overline{DF}$ which is the coincidence of the previously described $\overline{F}$ signal and the inverse of the described D signal. This composite signal extends from 4.5° to 13.5°; 22.5° to 31.5° etc. This particular waveform will be used in connection with FIGURE 9 together with certain other illustrated waveforms.

Transmitting circuits

Figure 8:
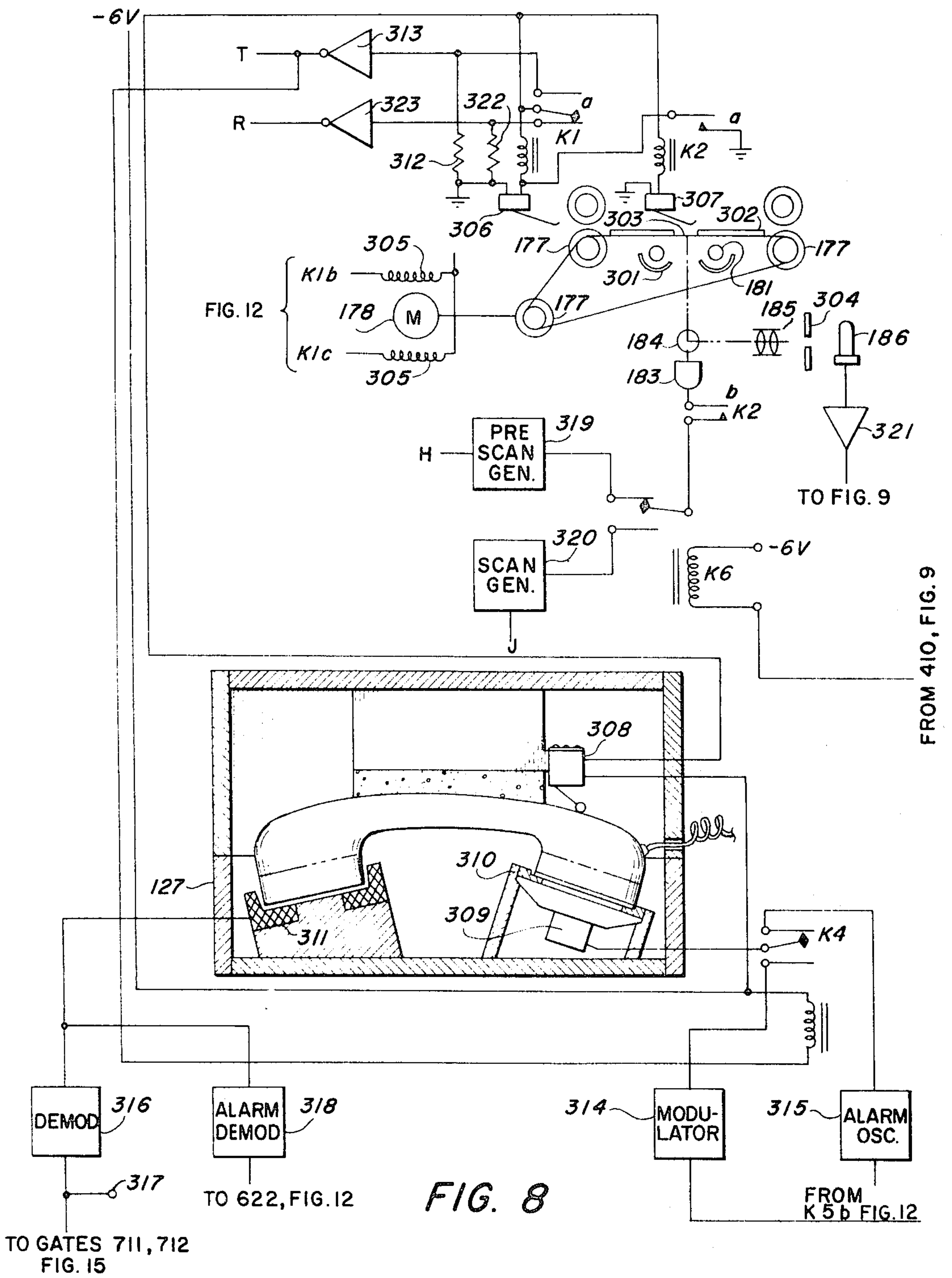
FIGURE 8 shows the transmitter and telephone transducer controls.

FIGURE 8 shows the scanner and telephone assemblies schematically in somewhat greater detail, together with their associated circuitry. It can be seen that the fluorescent lamps 181, shown previously in FIGURE 4, are provided with reflectors 301 and that a platen 302 is provided to support a document face down as it passes through the drive and pinch rolls 176 and 180. A slit 303 is provided in the platen between the lamps and immediately over the mirror galvanometer 183. Also shown in this figure is an aperture or stop 304 which is positioned between lens 185 and photomultiplier 186 to limit and define the size of the sampling area which is scanned back and forth across the document by mirror galvanometer 183.

Mirror galvanometer 183 may be any suitable device capable of rapidly converting an input signal into a corresponding rotation of a mirror. Commercially available mirror galvanometers of the type sold for use in multichannel optical recording oscillographs represent a suitable device of this type. A particularly suitable device for use in the illustrated embodiment of the invention can also be made by cementing a one-half inch diameter mirror to the pen shaft of a pen recording galvanometer, catalog No. 428647–920138, manufactured by The Brush Instruments Division of the Clevite Corporation, or to the shaft of comparable devices made by the Sanborn division of Hewlett-Packard Company.

Also shown in this figure are paper detector switches 306 and 307 which are positioned to detect the presence of a sheet of paper in the scanner. Switch 306 detects the presence of a sheet of paper as it is first presented to the scanner on the left side thereof, and switch 307 detects the presence of a sheet of paper within the scanner and approximately at the position of slit 303. Switch 306 operates an associated multi-contact relay K1 and switch 307 operates an associated multi-contact relay K2. Switch 307 may be replaced by a time delay circuit actuated by switch 306. Operating power for these relays passes through a switch 308 which is located in telephone box 127, and which is positioned so that it will close and pass current to relays K1 and K2 only if a telephone handset is properly seated in the box. Only if switch 308 is properly closed will insertion of a piece of paper into the scanner enable switch 306 to operate relay K1. Among its other functions, relay K1 transfers a contact K1*a* which supplies minus 6 volts to a resistor 312, the other end of which is grounded. The voltage appearing across resistor 312 is supplied to inverter 313, the output of which is a transmitter control voltage T which is at the logical "1" level only when relay K1 is operated. This output T is used to control the operation of the transceiver in the transmit mode. When switch 308 is closed but relay K1 is not energized, minus 6 volts is applied to resistor 322 instead of resistor 312. The voltage appearing across resistor 322 is supplied to inverter 323, the output of which is at the logical "1" level only when switch 308 is closed and relay K1 is not energized and, therefore, provides a receiver control voltage R to control the operation of the transceiver in the receive mode. Relay K2 has a contact *a* which holds relay K1 closed as long as relay K2 is closed. Accordingly, relay K1 will remain closed as long as a document is still over slit 303 and signal T will remain at the logical "1" level for that time. Relays K1 and K2 and other relays to be described later are shown with their contacts in the deenergized state of the relay. The relay contacts are not necessarily shown in physical proximity to the relay coil symbol.

Drive motor 178 is shown in association with a pair of drive coils 305. Many types of stepping motors may be used for motor 178, or motors 160 and 161. They may be, for example, an ordinary electrical solenoid associated with a pawl and ratchet drive, a rotary solenoid associated with a one-way drive clutch, a driving mechanism of a conventional stepping relay, or the socalled Cyclonome stepping motor sold by Sigma Instruments, Inc. This latter type is preferred and, as is well known, incorporates a pair of driving coils, corresponding to reference character 305, which are energized alternately by means to be shown in FIGURE 14.

Figure 11:
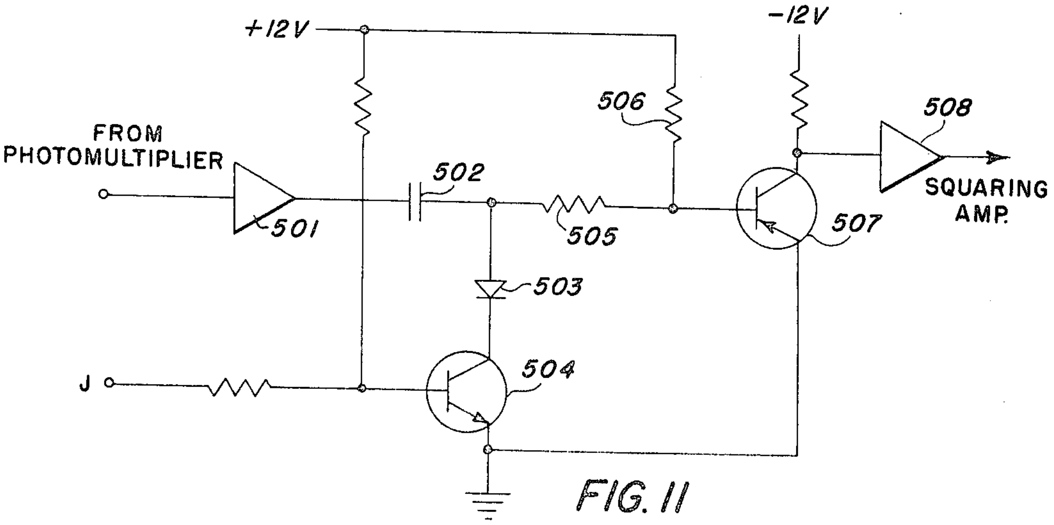
FIGURE 11 shows a video amplifier circuit used in FIGURES 9 and 10.

Photomultiplier 186 is connected to a gated squaring amplifier 321, more fully illustrated in FIGURE 11.

The energization of galvanometer 183 is controlled by a contact (*b*) or relay K2 so that the galvanometer is enabled to operate whenever a document is in position above the slit 303. The galvanometer drive power comes from either a prescan generator 319 or a scan generator 320, under the control of relay K6, which is under the control of the circuits of FIGURE 9. Scan generator 320 provides a linear ramp voltage which is synchronized with the rotation of drum 122 by means of incoming signal $\bar{J}$ from FIG. 6. Prescan generator 319 filters and amplifies the incoming 30-cycle square wave H from FIG. 6 to provide a 30-cycle sine wave signal which has ten cycles or twenty half-cycles per revolution of drum 122. A triangular wave would also be suitable. Suitable circuits for generators 319 and 320 are to be found in FIGURES 7 and 8, respectively, of S.N. 471,-799, filed July 14, 1965. The reasons for providing both a high speed and a low speed scanning waveform will become apparent later in the specification and are also set forth in said S.N. 471,799, filed July 14, 1965.

Referring to telephone box 127, there is provided a small loudspeaker 309 and a soft annular gasket 310 to seal the loudspeaker 309 to the microphone unit of handset 137. Loudspeaker 309 is connected through a relay K4 to modulator 314. Relay K4 is operated by switch 308 so as to connect the modulator to the loudspeaker only when the transceiver is in the transmitting mode. The modulator may be of any of the varieties known to the art. A highly satisfactory form of modulator comprises a voltage controlled multivibrator oscillator followed by an audio amplifier, such that sound at 1300 cycles is applied to the telephone for one of the levels of a two-level input signal applied to the modulator, and sound of about 2300 cycles for the other input level. This arrangement has proven very satisfactory for introducing facsimile signals into a telephone circuit without making an electrical connection thereto. When the transceiver is not in the transmit mode, loudspeaker 309 is disconnected from modulator 314 and is connected through relay K4 to an alarm tone generator 315 which is controlled from the alarm circuits of FIGURE 13 and supplies a lower frequency sound, i.e., 800 cycles, into the telephone.

An inductive pickup coil 311 is provided in telephone box 127 under the earphone end of handset 137 to pick up incoming signals. The coil may be of the shape shown and may be comprised, for example of 7900 turns of #34 insulated wire with an inductance of about 2.2 henries at 1000 cycles. It has been found that there is sufficient leakage flux from a telephone receiver, particularly those used in the Western Electric 500 subscriber set, to permit efficient signal pickup by means of the illustrated coil. As an alternative, particularly where the facsimile equipment must be used with other types of telephone instruments having well shielded receivers, pickup coil 311 may be replaced by a microphone acoustically coupled to handset 137 for picking up the acoustic signals radiated by the handset. The signals from coil 311, or from the microphone, are demodulated in a demodulator 316 of a type appropriate for use with the selected form of modulator 314 to produce an output signal corresponding to the input signal to modulator 314. If desired, coil 311 can also be used to couple signals into a telephone for transmission. A terminal 317 is also provided on the output side of demodulator 316 to permit the direct reception of facsimile signals from a telephone company data set or the like, as an alternative to signal transmission via a conventional telephone subscriber set, as shown in FIGURE 8. A very sharply tuned, narrow band demodulator 318 is also connected to pickup coil 311 to provide an output signal responsive to detection of a selected tone transmitted by alarm tone generator 315.

Voice grade telephone lines are a convenient facsimile transmission medium because of their universal availability, but proivde a far from ideal transmission for facsimile or other data type signals. For this reason, it is desirable in modulator 314 and demodulator 316 to provide the technical refinements which are known to the art, in order to maximize the quality of transmitted images and the speed at which they can be transmitted. While not a part of this invention, it has been found desirable to pass the facsimile signals intended for transmission through a low pass filter to eliminate abrupt transitions and shift the signal power spectrum toward lower frequencies and to apply this filtered signal to an FM or frequency shift (FSK) oscillator, such as a voltage controlled multivibrator, which has linear output frequency versus input signal characteristics. At demodulator 316, it is desirable to employ delay equalization to compensate for the non-uniform delay versus frequency characteristics of a typical telephone channel, and to apply the resulting phase delay compensated signal to a wide band frequency modulation or frequency shift detector to derive a suitable output signal. With these refinements it is possible to achieve high quality facsimile transmission, making effective use of the national switched telephone network, even allowing for the inevitable signal degradation involved in transducing the facsimile output signal through a loudspeaker into the carbon microphone of a telephone and in transducing the input signal from an imperfect telephone receiver. Other forms of modulation, such as amplitude modulation or vestigial sideband modulation may also be employed.

Figure 9:
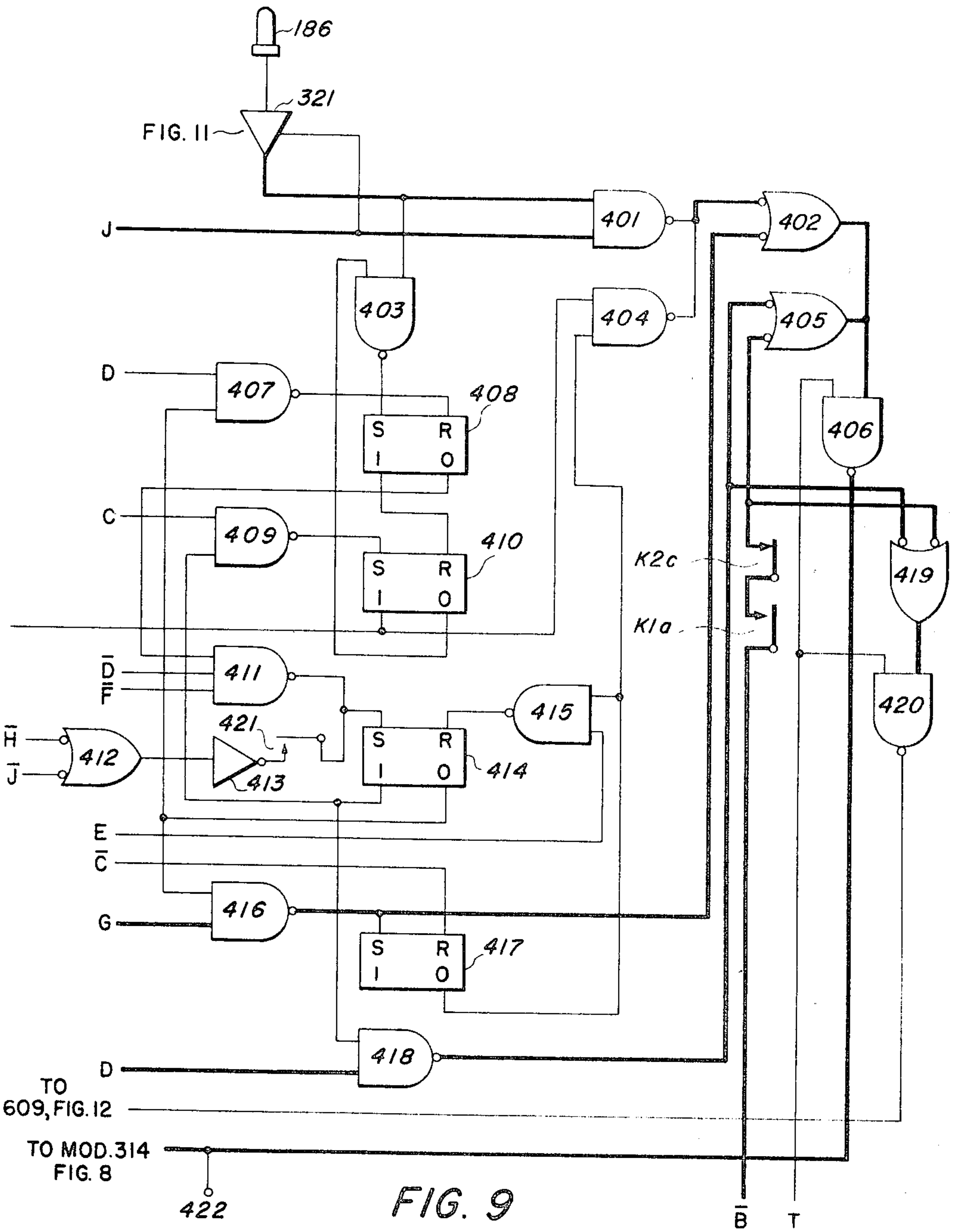
FIGURE 9 shows the transmitter logical circuitry.

FIGURE 9 shows the logical circuitry which is used to control the operation of the facsimile scanner and to generate an appropriate facsimile signal for transmission. As an aid in understanding the operation of the illustrated circuits, the paths of the principal transmitted signals, as opposed to internal control signals, are shown in bold lines. There are four of these signals which are combined in a four input NOR gate consisting of gates 402 and 405, gated against the transmit control signal in gate 406, and applied to the modulator 314, previously described in connection with FIGURE 8. A terminal 422 is also provided to permit these signals to be applied directly to a data set. The first of these signals is the facsimile video signal itself, which is a two-level signal derived by amplifier 321 from the output of photomultiplier 186 which is, in turn, related point by point to the density of a document being scanned with the aid of mirror galvanometer 183. This signal is gated in NAND gates 401 and 403. One of these gating signals is the signal J which prevents the video signal from ever getting through to NOR gate 402 in the interval from 355.5° to 31.5° of the drum rotation of drum 122, this period being allotted to the scanning of clamp bar 123 and for the transmission of certain control signal. The next signal of significance is the previously described once per revolution prevideo signal G which is gated in NAND gate 416 by an output of advance control flip-flop 414. The third signal is the 20 times per revolution advance clock signal D which is gated on and off in NAND gate 418 by the other output of flip-flop 414 from that used to control the prevideo signal in gate 416. The fourth signal is $\overline{B}$ which is a one time per revolution signal and the inverse of the previously described B signal. This signal, unlike the others, is applied directly to the NOR gates 419 and 405 without inversion in a prior NAND gate. This signal must pass through a normally open contact of relay K1 and a normally closed contact of relay K2.

In addition to generating a composite video signal for transmission, the circuit of FIGURE 9 generates two other important signals for internal use. One of these signals is a composite of the D and B signals only, from the transmitted video signal. This signal is generated by means of a NAND gate 419 which has the same input connections as NAND gate 405, and the output of which is gated in NAND gate 420 by the transmit control signal, in the same manner as the composite video signal is gated by gate 406. This signal is applied, through circuits shown in FIGURE 12, to the scanner stepping motor 178, shown in FIGURE 8. Later, it will be shown that this component of the transmitted video signal causes pen carriage 154 at a remote connected transceiver to advanve incremently in synchronism with the document advance in the transmitting transceiver. The other signal produced in FIGURE 9 is the output of scan control flip-flop 410 which is applied to relay K6 in FIGURE 8 to control the operation of mirror galvanometer 183 between the slow, one-linear scan per revolution mode, and the fast scan mode in which twenty back and forth scans are made per revolution.

Figure 10:
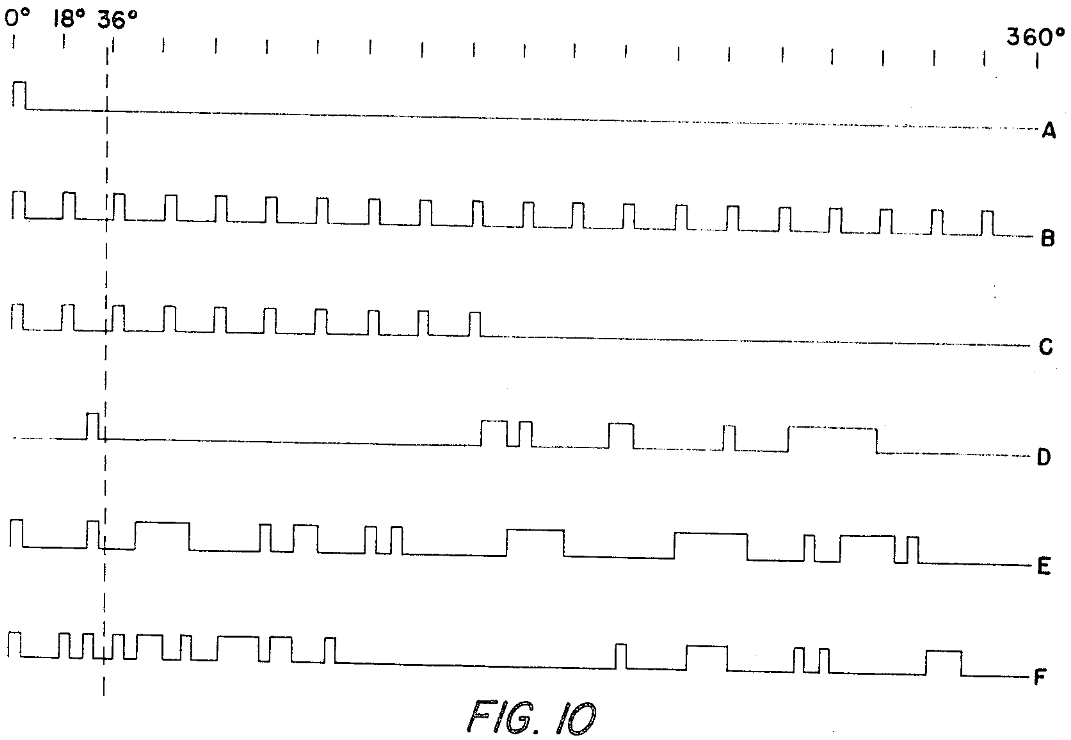
FIGURE 10 shows waveforms generated in the circuit of FIGURE 9.

The circuit of FIGURE 9 commences to function when a telephone is placed in box 127 of FIGURE 8 and a document is inserted into the scanner actuating switch 306, also of FIGURE 8. This will energize relay K1, closing contact K1*a* in FIGURE 9 and permitting signal $\overline{B}$ to pass through normally closed contact K2*c* and through gates 405 and 406 for transmission to a remote transceiver. This same signal is also transmitted through gates 419 and 420 to the apparatus of FIGURE 12 from which it returns to stepping motor 178 of FIGURE 8 to operate the motor at a rate of 1 incremental advance per revolution of drum 122, i.e., three advances per second. The transmitted signal under the described conditions is shown in FIGURE 10*a*. When a document has advanced to the position of switch 307, relay K2 will be energized thus opening normally closed contact K2*c* and interrupting the transmission of the B signals. At the same time, contact K2*b* (FIGURE 8) will close and commence the scanning operation of mirror galvanometer 183.

At this point, it is necessary to consider the signals emanating from photomultiplier amplifier 321 as well as the initial states of control flip-flops 408, 410, 414 and 417. Assuming that the apparatus is to be adapted for use with ordinary documents having black on white information, rather than the reverse, the output of amplifier 321 will be at the logical "1" level, i.e., zero volts, when the photomultiplier is looking at a black element of the document and at the logical "0" level, i.e., minus 6 volts, when the photomultiplier is looking at a white background element. Initially, i.e., before photomultiplier 186 sees any printed material or the like, flip-flops 408, 410, 414 and 417 will be in the 1, 0, 1, and 1 states, respectively. This can be verified by examining a subsequent discussion of the operation of the circuit when photomultiplier 186 scans completely blank lines on the document after having scanned lines containing marks, printing or the like. Under the initial conditions, flip-flop 410 acting through gate 404 prevents any signals from amplifier 321 from being transmitted and also leaves relay K6 in FIGURE 8 deenergized so that galvanometer 183 is connected to prescan generator 319. Flip-flop 414 enables D signals to pass through gate 418 and to be transmitted through gates 405 and 406. This same signal is also transmitted through gates 419 and 420 to operate stepping motor 178 in FIGURE 8. Finally, flip-flop 414 also disables gate 416 and prevents prevideo signal G from being transmitted. The transmitted signal under the described condition is shown in FIGURE 10*b*. Under these conditions, the transmitted document is advanced at the rate of 60 increments per second, which is 20 times as fast as lines can be recorded on drum 122. As will be shown later, pen carriage 154 is advanced at this same rapid rate in a remotely connected matching transceiver.

As soon as a black area is detected in the document being scanned, the operation of the circuit of FIGURE 9 becomes quite different. The absence or reduction of light falling on photomultiplier 186 causes a logical 1 output signal to be produced by squaring amplifier 321 and this signal is enabled to pass through gate 403 to set flip-flop 408 to the 0 state and thereby reset flip-flop 410 to the 1 state. The new state of flip-flop 410 causes galvanometer 103 to be connected to the slow scan generator 320 rather than the fast prescan generator. At the next coincidence of the $\overline{D}$ and $\overline{F}$ signals (see FIGURE 7) the logical "1" level at the 0 output of flip-flop 408 is enabled to pass through gate 411 to set flip-flop 414 to the 0 state, thereby preventing any further advance clock signals D from passing through gate 418, but permitting the next D signal to set flip-flop 408 to the 1 state through gate 407. No further signals are transmitted until the next appearance of prevideo signal G. The transmitted signals during a drum revolution of this type are shown in FIGURE 10*c*. At the next appearance of the prevideo signal G the level at the 0 outut of flip-flop 414 is enabled to pass through gate 416 to set flip-flop 417 to the 0 condition and at the same time the G signal is applied to NOR gate 402 and passes through gate 406 for transmission. The 0 output of flip-flop 417 is applied to gate 404 and directly thereafter (see FIGURE 7) video gate signal J is applied to gate 401. The combined presence at gates 401 and 404 of signal J, the 0 output of flip-flop 417, and the 1 output of flip-flop 410 enables the video signals from amplifier 321 to pass through gates 401 and 404 and through gate 406 for transmission. The remainder of this revolution, or slow scan cycle, is given over to the transmission of video information detected by photo-multiplier 186, as shown in FIGURE 10*d*. It should be noted that the line now being scanned by galvanometer 183 is the same line which was scanned once before at a more rapid rate under control of prescan generator 319, since the initial and immediate effect of the detection of a black area in the transmitted document was to prevent any further advance clock pulses D from either being transmitted to a remote transceiver or from being applied to stepping motor 178.

At the end of a slow scan of the type shown in FIGURE 10*d*, the video end signal E passes through gate 415 and sets flip-flop 414 to the 1 condition, whereby the next advance clock signal D is enabled to pass through gate 418. At the same time, $\overline{C}$ sets flip-flop 417 to the 1 state and short master signal C is enabled to pass through gate 409 to reset flip-flop 410 to the 0 state and once again enable video signals from squaring amplifier 321 to reach flip-flop 408. Galvanometer 183 is now again connected to prescan generator 319 which is phased with respect to the slow scan generator 320 so as to provide a rapid retrace following the slow scan. If no black areas are detected in the document being transmitted during this retrace interval, the galvanometer will continue to be driven by the fast prescan generator 319 and advance clock signal D will be transmitted through gate 418 after each fast scan. The transmitted waveform will then be as shown in FIGURE 10*d*. However, as soon as a black area is detected, the circuit of FIGURE 9 will revert to the slow scan mode already described and the transmitted signal for the remainder of the slow scan cycle will be as in FIGURE 10*c*. If a black area is detected along the very next scan line the transmitted waveform will be as in FIGURE 10*e*.

The operation of the facsimile transceiver in the transmit mode can now be described in a simplier way. In the absence of black areas or other marks which the photomultiplier and amplifier are designed to detect, a document will be rapidly scanned alternately from left to right and from right to left. No video information will be transmitted in this condition but characteristic advance signals will be transmitted and will also be directed to the transmitter stepping motor to advance a document one increment at the end of each scan. If a black area is detected during a fast scan, then the document is not advanced any further, a document advance signal is not transmitted, and the scanning action reverts to the slow mode. When the scanning mechanism, i.e. galvanometer 183, reaches the time and position at which a slow scan is about to commence, a characteristic prevideo alerting signal is transmitted and thereafter video signals corresponding to the scan are transmitted. At the end of the slow scan the document is advanced one increment, a paper advance signal is transmitted , and the galvanometer executes a rapid retrace during which video signals are not transmitted. If information is detected during the retrace, then a further slow scan is made and further paper advances or advance signals are withheld until the end of the slow scan. If no information is detected during the fast scan retrace, then the document is advanced at the end of the retrace, an advanced signal is transmitted, and further rapid scans and advances are made until such time as black areas or other information are detected. In this way, every elemental line of the document which contains information is scanned twice, first with a rapid scan and then with a slow scan during which video signals are transmitted. Lines bearing no information are merely scanned rapidly once. In this way a document can be scanned many times more rapidly than as usual where all areas of the document are scanned at normal speeds compatible with the transmission medium being employed, i.e., a telephone circuit. It will be appreciated that when scanning printed matter and particularly typewritten letters and the like, the majority of the scan lines will traverse only blank paper.

In a typical facsimile transceiver corresponding to the illustrated embodiment, the vertical resolution will be on the order of 100 scan lines per inch and the horizontal resolution, along the scan lines, will be approximately the same. This level of resolution is generally accepted as being adequate for transmitting printing, typing, handwriting, drawings and the like without loss of information and with an aesthetically acceptable level of quality. Increasing the resolution increases the quality of reproduced images but also increases the time required to transmit a document. It has been found, on the other hand, that skipping alternate scan lines, while maintaining horizontal resolution unaltered, halves the time required to transmit a document and provides intelligible, if less pleasing, facsimile copies where the original subject matter is in the nature of printing or typing. Means are provided to accomplish this result solely at the discretion of the transmitter operator by including switch 421, gate 412 and inverter 413. With switch 421 open the circuit of FIGURE 9 operates as previously described. In particular, at the end of a slow scan flip-flop 414 is set to permit a single advance clock pulse D at the 0 degree position to be transmitted and to actuate stepping motor 178. Immediately after this pulse has been transmitted the $\overline{D}\,\overline{F}$ signal passes through gate 411, resets flip-flop 414, and prevents the next D signal from passing through gate 418. With switch 421 closed, however, inverter 413 is connected with gate 411 and the two together function as a four input NAND gate. Now, the 30-cycle square wave, signal $\overline{H}$, is inverted in gate 412 and applied to inverter 413 and prevents the reset signal from being applied to flip-flop 414 during the critical period from 18 to 36° of rotation of drum 122. This is the period in which the second D pulse appears. Accordingly, in this mode of operation two consecutive advance pulses are transmitted and also applied to stepping motor 178 before prevideo signal G is transmitted. A typical transmitted waveform in this mode of operation is shown in FIGURE 10*f*. Thus, a document receives two incremental advances between each slow scan.

The double skipping feature is valuable as described but may cause narrow horizontal lines or the like to be completely missed when the transmitter is operating in this double skipping mode. The reference to narrow horizontal lines is intended to cover those markings which would be detected along only a single scan line. With the transceiver operating in the fast skipping mode as shown in FIGURE 10*b*, detection of information will cause the flip-flop 414 to be reset almost immediately and prevent further transmission of advance clock signals D, as shown in FIGURE 10*c*. With switch 421 closed, however, there would ordinarily be a 50% probability that the signal $\overline{H}$ would be at the wrong level and thus delay the resetting of flip-flop 414 and permitting the transmission of one additional advance clock signal D. The ensuing slow scan would therefore not be of the line in which the information was detected but instead the next subsequent line. This situation is substantially prevented by connecting the signal $\overline{J}$ to the other terminal of gate 412, which is conveniently considered as a NOR gate. When double skipping from one black containing line to another the circuit works exactly as previously described $\overline{J}$ being at the 0 volt level in the relevant time interval. However, when information is first detected within a sequence of fast scans $\overline{J}$ will be at the minus 6 volt level, and $\overline{D}$ $\overline{F}$ will be enabled to reset advance control flip-flop 414 regardless of the state of signal $\overline{H}$, thus preventing the transmission of further advance signals D.

FIGURE 11 is a simplified schematic diagram of the photomultiplier amplifier 321. An inverting voltage amplifier 501 amplifies the photomultiplier output and provides a signal which is more positive when the photomultiplier looks at a white or background area and more negative when it looks at a black area. This output signal is coupled to ground through capacitor 502 and rectifier 503 which together function as a peak rectifier providing an output voltage clamped to zero volts in background areas and negative in black areas. This voltage is coupled by resistors 505 and 506 to the normally positively biased base of pnp transistor 507. When the photomultiplier looks at a black area amplifier 501 will produce a negative output signal which, will cause transistor 507 to conduct and develop a "0" output from limiting post-amplifier 508. At other times the output of amplifier 508 is limited to minus 6 volts. During the time that photomultiplier 186 would otherwise be looking at the edges of a document or other portions which are not transmitted, transistor 504 is gated off by signal J as a result of which capacitor 502 is not further charged but holds its charge in accordance with the time constant determined by its value and that of resistors 505 and 506, i.e., "remembers" the background level. Accordingly, the output from amplifier 321 is a signal which is reliably at the preselected logical "1" value when black is being scanned and logical "0" when white is being scanned. It will be realized that more complex black/white decision making circuitry may also be employed such as that disclosed in copending applications Ser. No. 329,640, filed Dec. 11, 1963, now Patent No. 3,394,222, issued July 23, 1968, or Ser. No. 461,693, filed June 7, 1965.

Receiver and alarm circuits

Figure 14:
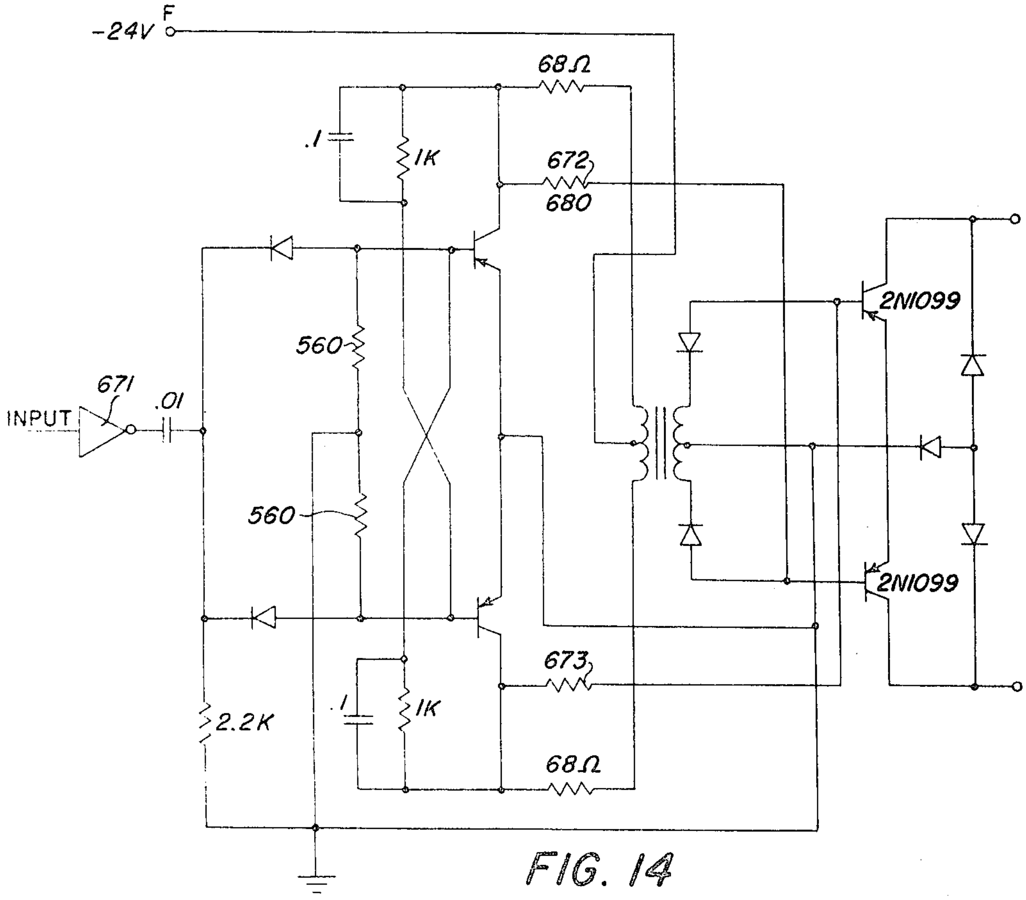
FIGURE 14 shows the stepping motor drive amplifier.

FIGURE 12 shows the power and control circuits of the printer portion of the transceiver. Recording drum 122 is driven by a motor 150 as already shown in FIGURE 3. Motor 150 is operated by signal A from FIGURE 6, after suitable amplification by a power amplifier 601. Pen carriage 154 is mounted on a lead screw 159 driven by stepping motors 160 and 161 as also shown in FIGURE 3. In this figure, the individual drive coils 606 for motor 160 and 607 for motor 161 are shown. The stepping motors used to incrementally drive lead screw 159 may be of any suitable type as disclosed in connection with stepping motor 178. In the described embodiment stepping motors 160 and 161 may be of the Cyclonome type manufactured by Sigma Instruments, as previously described in connection with stepping motor 178. A unitary assembly of two of these unidirectional stepping motors mounted back-to-back on a common shaft is available under the designation model 9AH. The stepping motors are driven by pulses applied in alternation to the two drive coils and a special amplifier 608, shown in greater detail in FIGURE 14, is provided to generate the necessary drive pulses. The output of this amplifier is connected to contacts *b* and *c* of relay K1 (FIGURE 8) which direct the pulses to either the recorder stepping motors of FIGURE 12 or the transmitter stepping motor of FIGURE 8. When a document is not being transmitted relay K1 will not be energized and the contacts will be in the illustrated position wherein amplifier 608 is connected to the printing components rather than the transmitting components.

A further set of relay contacts K3*d* and K3*e* determine whether the pulses are applied to forward stepping motor 160 or reverse stepping motor 161. Relay K3 is illustrated in this figure and will be described. To complete the description of this portion of the figure, it is noted that a further contact on relay K3 enables amplifier 608 to be driven either by the D pulses from FIGURE 6 or by pulses from a NOR gate 609 which is connected both to gate 420 of FIGURE 9 and to gates 734 and 735 of FIGURE 15, yet to be described. The pulses derived from FIGURE 9 are intended to be applied to stepping motor 178 of FIGURE 8 and this is accomplished through previously described relay contacts K1*b* and K1*c* which switch the output of amplifier 608. The pulses from the circuit of FIGURE 15 are the pulses intended to operate stepping motor 160 and will pass from amplifier 608 to motor 160 through the previously described relay contacts when a document is not being transmitted.

Figure 15:
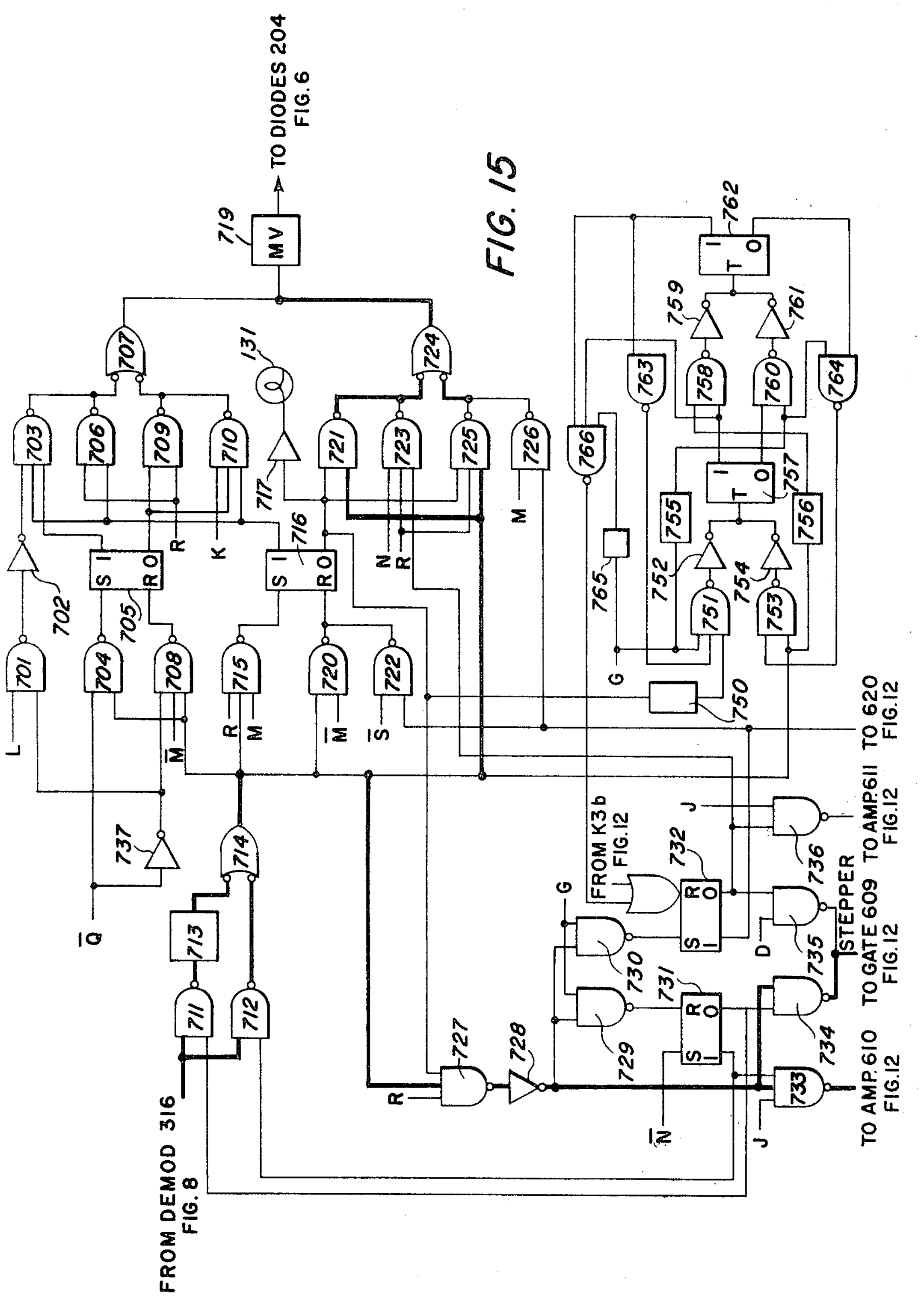
FIGURE 15 shows the printer logical circuits.

A power amplifier 610 amplifies the printing or video signal from FIGURE 15 and applies it to the marking tip 156 and an amplifier 611 amplifies the pen engage signal from FIGURE 15 and applies it to the electromagnetic assembly 157 of pen carriage 154.

Cams 162 and 163 are associated with drum 122 as previously shown in FIGURE 3. A voltage of minus 6 volts is applied through switch 164 to grounded resistor 602, and through switch 165 to grounded resistor 604, the switches being actuated by cams 162 and 163 respectively. The voltage appearing directly across resistor 602 is the previously described control voltage $\overline{M}$ and this voltage when inverted in inverter 603 is control voltage M. Similarly, the voltage $\overline{S}$ across resistor 604 is inverted in inverter 605 and becomes control voltage S. These voltages are used to control the timing circuits of FIGURE 6 and their functions have already been described. It will be understood that there are many other ways of deriving such control voltages from the rotation of drum 122. Magnetic proximity switches, photoelectric detectors and the like could be used equally as well as the illustrated cam operated switches. Furthermore, a switch or the like may be used to initiate a control signal at a desired position of drum 122 and a multivibrator circuit or the like may then be used to determine the duration of the signal. It will also be understood that the functions of switches 164 and 165 may be performed through the use of additional dividing stages, gating circuits and the like in FIGURE 6. However, the illustrated method of deriving these signals is particularly simple, economical, and reliable.

Limit switches 612 and 613 are positioned adjacent the ends of lead screw 159 and are adapted to be engaged by pen carriage 154 at the left and right limits of travel. Switch 613 has a normally open contact which is closed by contact with the pen carriage at the end of the normal travel of carriage 154 and switch 612 has a normally closed contact which is opened by the pen carriage as it returns to the starting position. The closing of switch 613 energizes relay K3 which causes contact (*a*) to close and maintain relay K3 energized through a circuit including switch 612. The energization of relay K3 causes the input of drive amplifier 608 to be connected to D signals from FIGURE 6 and causes the output of the driver amplifier to be transferred from forward stepping motor 160 to reverse stepping motor 161. A further contact on relay K3 causes a control voltage to be sent to the circuit of FIGURE 15, yet to be described. With relay K3 energized, pen carriage 154 is returned rapidly to the left at the rate of 60 increments per second by stepping motor 161. When carriage 154 returns to the starting position, it opens switch 612 which deenergizes relay K3 and returns the various stepping motor drive connections to their normal forward position, preparatory to recording a new document on drum 122.

Three one-shot multivibrators 620, 621 and 622 are connected with their outputs in parallel so that any one of them may energize a relay K5. Multivibrator 621 is further provided with an inverter 623 to permit actuation by an incoming negative instead of positive signal. When K5 is energized, contact (*a*) closes and maintains the relay energized through a circuit including alarm reset switch 130. The other contact (*b*) applies a voltage to a warning alarm signal 624 and to previously described alarm oscillator 315 of FIGURE 8. To stop the alarm signal the operator must operate reset switch 130 which breaks the relay hold connection from contact (*a*) but also momentarily energizes relay K3. Accordingly, when the alarm is turned off pen carriage 154 will be returned to its starting position.

Multivibrator 622 is connected to the output of the narrow band demodulator 318 of FIGURE 8, which detects an alarm operation at a remotely connected receiving unit when the illustrated transceiver is in the transmit condition. Multivibrator 621 is connected to the transmit control signal T and signals an alarm whenever that signal is lost, which may be due to premature removal of the telephone from the telephone coupling box or to the conclusion of the transmission of the document. Multivibrator 620 is connected to a control signal from FIGURE 15 which indicates either loss of receiver synchronization or the unavailability of further recording capacity as indicated by pen carriage 154 reaching switch 613 at the end of its available travel. Accordingly, the alarm signal will indicate the completion of the transmission of the document at both transmitter as well as at the receiver, will signal at a receiver loss of synchronization or the lack of further recording capacity, will indicate the premature removal of the telephone from the telephone box, and will signal, at a transmitting unit, the actuation of the alarm at a remotely connected receiving unit. Resetting the alarm at a receiving unit causes the recording mechanism to reset into position for a new attempt at recording.

FIGURE 13 is a modified version of a portion of FIGURE 12. Drum 122, drive motor 150 and gears 151, 152 and 153 remain as before. However, a rotary potentiometer 661 is now connected to idler gear 152 and a rotary potentiometer 662 is connected to drum 122. Each potentiometer is connected to positive and negative potential sources as shown. The voltage appearing at the wiper will then be a predetermined function of the potentiometer shaft position. Potentiometer 661 provides a 30 cycle waveform which, when amplified, can be used to drive galvanometer 183 in the prescan mode. Potentiometer 662 generates one substantially linear waveform per revolution of drum 122. This signal, when amplified, can drive galvanometer 183 in the normal scan mode. Thus the illustrated potentiometers can replace either or both scan generators 319 and 320 shown on FIGURE 8. The waveform produced by potentiometer 662 can be made slightly nonlinear to compensate for the slightly nonlinear tangent relationship relating the drive voltage applied to galvanometer 183 and the resulting sampling spot displacement. Film type potentiometers with characteristics suited for the illustrated application are obtainable from Computer Instruments Corporation. Since a suitable flyback can be incorporated in the waveform from potentiometer 662, or scan generator 320 minor modifications in the circuit of FIGURE 9 will permit potentiometer 662 or generator 320 to control galvanometer 183 both during slow scans and fast scans following slow scans.

FIGURE 14 is a simplified schematic diagram of the stepping motor drive amplifier 608 shown in FIGURE 12. An inverting voltage amplifier 671 drives a trigger flip-flop circuit which is functionally similar to that shown in FIGURE 5*e*. The output of the flip-flop is transformer coupled to a pair of output transistors which provide a short duration pulse to a different stepping motor coil (not shown in this figure) each time a positive pulse is applied to amplifier 671. The illustrated circuit is a modification of a stepping motor drive circuit. Because of the use of the coupling transformer only short pulses would normally be supplied to the stepping motor coils. However, it has been found that the performance of the stepping motor as at the high speeds desired in the present invention is materially improved through the addition of the two 680 ohm coupling resistors 672 and 673. These provide a direct current coupling from the flip-flop to the output transistors such that the initial short duration pulse to a stepping motor coil is followed by a steady hold current of lesser intensity which continues after the normal advance pulse is completed. This provides additional braking and electrical detent forces which help to stabilize the stepping transient more rapidly.

FIGURE 15 shows the receiving and synchronizing logical circuitry. Heavy lines again indicate signal flow. It is convenient to assume initially that the transceiver is in the receive mode, as controlled by the absence of a document in the scanner, and that the timing circuits of FIGURE 6 are in synchronism with those of the remote transmitter. The incoming signal from demodulator 316 of FIGURE 8 is applied to gates 711 and 712 in parallel. The output of gate 712 is applied to one input of NOR gate 714 while the output of gate 711 first passes through a delay one-shot circuit 713 before being applied to the other input of NOR gate 714. One-shot 713 ignores any signals which are in the logical "1" state for less than 1 millisecond. Signals longer than 1 millisecond trigger the one-shot and produce a 4.2 millisecond or 4.5° output pulse, the start of which is delayed 1 millisecond with respect to the input pulse. The one-shot is used to process control pulses as opposed to video signals to prevent the response of subsequent circuits to noise pulses, etc. Either the direct input signals or those processed by one-shot 713 may be supplied to the remainder of the circuits of FIGURE 15 depending upon whether gate 711 or gate 712 is enabled. Initially, gate 711 is open and gate 712 is closed permitting the signal from one-shot 613 to pass through NOR gate 714 to NAND gate 727. The other two inputs to this gate are the receiver control level R and a signal indicative of synchronization. When the transceiver is in the receiving mode and is properly synchronized to a remote transmitter, the incoming signals will be enabled to pass through gate 727 and inverter 728 from which they are applied to gates 729, 730, 733 and 734. As soon as a coincidence is detected in gate 729 between the incoming signal and an internal prevideo signal G, the output of gate 729 will set flip-flop 731 to the "1" state which in turn will disable gate 711 and enable gate 712, permitting unprocessed input signals to be distributed throughout FIGURE 15. Any subsequent signals arriving at gate 733 within the printing period determined by video gate signal J will pass through gate 733 and be applied to the marking tip in FIGURE 13. At the end of each printing line, signal $\overline{N}$ will reset flip-flop 731 thus disabling gate 733 and conditionally enabling gate 734, which forms a four input NAND gate with gate 735. The same coincidence with internal G pulse which first set flip-flop 731 simultaneously resets flip-flop 732 through gate 730.

While the state of flip-flop 731 and gates 711 and 712 is changed at the end of every printing line, flip-flop 732 will normally remain in the reset condition until a document has been completely recorded on drum 122. With flip-flop 731 in the reset condition and flip-flop 732 in the reset condition also, coincidences are detected between the incoming signal and the internal D signal and each such coincidence is applied through NOR gate 609 in FIGURE 12 to stepping motor 160 of that same figure. Reference to the description in connection with FIGURES 9 and 10 will show that the printer stepping motor 160 will exactly follow the operation of scanner stepping motor 178 in a remote connected transmitter.

As long as flip-flop 732 remains in the reset condition the recorder marking tip will be held against drum 122 by virtue of gate 736 connected between flip-flop 732 and amplifier 611 of FIGURE 12. Signal J is also applied to gate 736 to lift the marking tip when passing over clamp bar 123. Thus, neither the marking nor stepping functions can start until the first incoming prevideo pulse G is received. When recording should not be further continued, flip-flop 732 will be set either by an input from contact (*b*) of alarm relay K5 in FIGURE 12, or by an out-of-sync signal from circuits shown on FIGURE 15. The setting of flip-flop 732 by an out-of-sync signal will also cause the alarm circuitry in FIGURE 12 to operate because of the indicated connection between the 1 output of the flip-flop and alarm multivibrator 620 of FIGURE 12.

Figure 16:
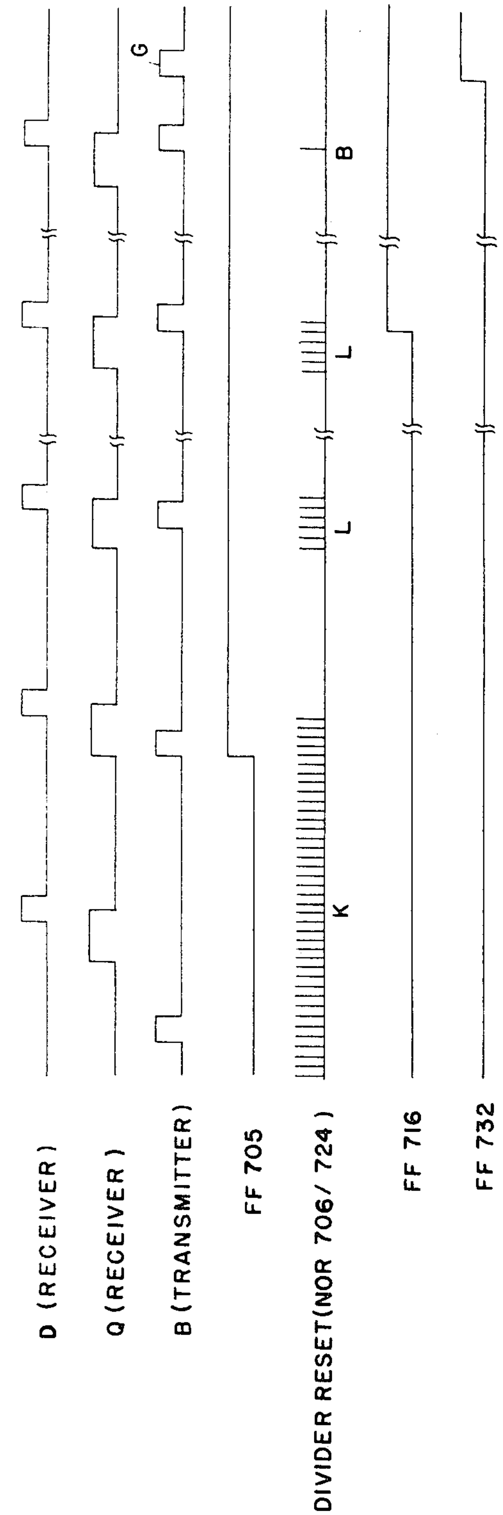
FIGURE 16 shows waveforms illustrating the achievement of synchronization.

In order for any two transceivers according to this inventor to work with each other, they must be brought into and kept in synchronism with each other. More specifically, this means that the D signal generated in the receiver must remain in substantial coincidence with the corresponding incoming signal, or that the D signal generated within the receiver must have the same relationship to the rotation of drum 122 as the corresponding received pulse did to drum 122 of the matching transmitter when it was transmitted. By referring back to FIGURES 9 and 10*a* it can be seen that the facsimile transceiver of the invention always transmits a series of B signals prior to the transmission of any control or video signals. These signals can be used to establish synchronization at the corresponding receiver and means are also provided whereby synchronism can be maintained throughout the transmission of a document. Assuming that the receiver is initially far out of synchronism with the transmitter, the situation will be that depicted at the left side of FIGURE 16, which shows various waveforms involved in the synchronization process. The fact of nonsynchronization will be detected in gates 720 and 722 which collectively form a four input NAND gate. The integrated video from one-shot 713 is compared against the signal $\overline{M}$ which is the inverse of the waveform derived from cam 162 and extends from 7.5° to 352.5°. If the incoming B signals fall within this interval a conditional coincidence will be detected in gate 720 between the incoming signal and the $\overline{M}$ signal. Gate 722 is enabled by the 1 output of flip-flop 732 which, as previously described, is initially in the set condition, and the signal $\overline{S}$ which prevents the first received prevideo signal G from passing through the gate. The out-out-coincidence signal from gate 720 and 722 sets flip-flop 716 to the 1 state and lights signal light 131 through amplifier 717. If the receiver and transmitter are badly out of synchronization, then the received B signals will also fall outside the internal Q signals and a coincidence will be detected in gate 704 between the incoming signals and the $\overline{Q}$ signal, thus resetting flip-flop 705 to the 0 condition.

With flip-flop 705 and 716 in the described condition and with the receiver control signal R at the logical "1" level, K signals will be enabled to pass through gate 710 and through NOR gate 707 to multivibrator 719 which generates a .2 millisecond positive pulse. The pulse from multivibrator 719 is applied to reset diodes 204 in FIGURE 6 and resets all stages of counter 203 to zero. Since signal K is generated in FIGURE 6 at a count of 56, counter 203 resets at the count of 56 rather than the normal count of 64 and all the waveforms as well as drive motor 150 and drum 122 are speeded up by the ratio of 64 to 56 or about 14%. This causes the signal D to rapidly catch up with the signal B received from the transmitter.

Since the receiver drum 122 now rotates more than 410° for each revolution of the corresponding transmitter drum, it is possible in one revolution to go from the condition wherein the received B pulse is in advance of the internal M signal to the condition where it is behind. An in-sync condition would not be detected under these circumstances and the eventual establishment of synchronization would be delayed. This possibility could be eliminated by speeding up the counter by a lesser amount, so that the receiver drum catches up more gradually with the transmitter drum, or by making the M signal window larger. The first of these approaches would always increase the time required for synchronization and the second is also undesirable. In the illustrated circuit however, the coincidence between the received B signals and the Q signal is first determined. The combined length of the overlapping M and Q signals is such that the B signal cannot pass through in a single revolution. Signal $\overline{Q}$ is inverted in inverter 737 to form signal Q which is then compared in gate 708 with the incoming signal from NOR gate 714 and also with the signal $\overline{M}$. If a coincidence is detected between the incoming signal and the Q signal, but not with the M signal, then flip-flop 705 will be set to the 1 condition and the flow of K signals through gate 710 will be halted. Instead, L signals previously gated against Q signals in gate 701 and inverter 702 are enabled to pass through gate 703 and from there through NOR gate 707 to multivibrator 719. Signal L is generated in the circuit of FIGURE 6 at counts 62 and 63 and accordingly, when used to reset the counter causes the counter and associated components to speed up in the ratio of 64 to 62 or about 3%. However, signal L can get through gate 701 only when signal Q is also present with the result that relatively few of the L pulses get through to reset the counter, which thus cycles at an average rate only slightly greater than the normal 60 per second. This permits the receiver to slowly advance the small amount still required to achieve full synchronization.

When substantial synchronization is finally achieved, a coincidence will be detected in gate 715 between the incoming signal and the internally generated M signal, and gate 715 will reset flip-flop 716 to the "0" condition thus extinguishing lamp 131 and preventing either the K or the L reset signals from reaching NOR gate 707. At the same time, flip-flop 716 will enable gate 727 and permit the previously described printer control circuit of this figure to respond to incoming signals or control signals or control or video signals. It will be remembered however, that the printer does not begin to print to step until the first prevideo signal G has been received, thus preventing any wastage of the recording paper wrapped around drum 122. The receipt of the first prevideo signal G will, in resetting flip-flop 732, disable flip-flop 722 and prevent subsequent video signals from thereafter changing the state of flip-flop 716.

Gates 721 and 723 and gates 725 and 726 can be considered as two separate five input NAND gates. Each of these five input gates is conditionally enabled by the 0 output of flip-flop 716 and each is connected to the incoming signals from NOR gate 714. Each is conditionally enabled by the receiver control signal R. However, one gate is enabled by signal M while the other is enabled by delayed signal N. Finally, the gates are alternately enabled by flip-flop 732. Prior to the receipt of the first prevideo signal G flip-flop 732 is in the set condition and enables gates 725 and 726. Any incoming signal, presumably a B signal or a D signal which appears in the interval determined by signal M, will be passed through NOR gate 724 to the previously described multivibrator 719 and will reset counter 203 of FIGURE 6 to zero. In this way, the receiver counter is finally brought into exact phase coincidence with the transmitter counter, thus achieving perfect synchronism. A correction of ±9° is possible in this way. Even though the receiver oscillator 202 may be slightly faster or slower than the corresponding transmitter oscillator, the accumulated phase error between the two is eliminated at each revolution of drum 122 throughout a facsimile transmission.

After the first prevideo signal has been received, flip-flop 732 will be in the reset condition and gates 721 and 723 will be operative rather than gate 725 and 726. This permits the reset pulses be applied to counter 203 to be gated against signal N rather than signal M to provide greater protection against a false reset by a pulse at the end of the period allotted for transmission of video as opposed to control signals. During the actual facsimile printing operation the incoming signal will be switched back and forth between gates 711 and 712 so that video signals are distributed unaltered throughout the circuit of FIGURE 15 but control signals are first passed through one-shot 613.

The circuits of FIGURE 15 can also be used in substantially unaltered form to achieve synchronization by a different method. Instead of using a fixed frequency oscillator 201 in FIGURE 6 driving a variable ratio divider 203, as previously described, the oscillator could be of a controllable frequency variety and counter reset diodes 204 could be eliminated. In the transmit more, no control signals would be applied to the oscillator and the transceiver would work precisely as previously described. In the receiving mode flip-flop 705 would be used to gate either of two control voltages to the oscillator to cause it to speed up by a greater or lesser amount as described. Achievement of approximate synchronization would reset flip-flop 716 as before, which would cause incoming control signals to be gated through gates 721, 723, 725, and 726 to a conventional phase sensitive detector which would compare them with the internal B signal and produce a variable phase lock correction signal for application to oscillator 201.

A hybrid system may also be employed wherein counter 203 retains its reset capability and oscillator 201 is once more a stable oscillator but with a limited frequency control capability. In this modification flip-flop 705 would direct reset signals to counter 203 as previously described to achieve rough synchronization, after which flip-flop 716 would be reset to enable a phase sensitive detector to generate a control voltage for application to oscillator 201 to achieve and thereafter maintain precise synchronization.

FIGURE 15 also includes a reversible counter synchronization monitor circuit to warn of loss of synchronization. Internally generated G signals are applied to gate 751, which however, is disabled by flip-flop 716 until after synchronization is achieved. About the time when approximate synchronism resets flip-flop 716 into the zero state signals will arrive at gate 753 within the time interval determined by signal N. Assuming that trigger flip-flop 762 as well as trigger flip-flop 757 are in the 1 state, then the output of gate 764 will be at the zero volt or logical "1" level and incoming B or D signals will pass through flip-flop 753 and inverter 754 and switch flip-flop 757 to the 0 state. The next input signal at gate 753 will switch flip-flop 757 back to the 1 condition. Shortly thereafter the input signal to gate 753, after passing through delay circuit 756 such as multivibrator, will arrive at gate 758 and permit the 1 output of flip-flop 757 to pass through inverter 759 and switch flip-flop 752 to the 0 state. The third successive input signal at gate 753 will switch flip-flop 757 once again to the 0 level. With both flip-flops at the zero level gate 764 will disable gate 753 and further incoming signals appearing at the gate will have no effect.

About a second after flip-flop 716 is reset, the time being determined by delay element 750, gate 751 will be enabled to accept internally generated G signals. The effect of signals passing through gate 751 is exactly the opposite of those passing through gate 753, due to the general symmetry. Assuming flip-flops 757 and 762 were both in the 0 state, the first incoming G pulse would set 757 to 1, the next would set 757 to 0 and 762 to 1, and the third would set 757 to 1 and keep 762 at 1. Gate 763 would then prevent further G pulses from changing the states of the flip-flops. However, the next G pulse would be differentiated by differentiator 765, i.e., a capacitor, and applied to an input of gate 766, the other two inputs of which are connected to the 1 outputs of the two flip-flops. A coincidence will be detected at gate 766, the output of which sets flip-flop 732 back to the 1 state and accordingly initiates the alarm action shown in FIGURE 12.

In normal operation flip-flop 757 and 762 are in the 0 state before the arrival of the first prevideo signal G as a result of the arrival of three or more B or D signals at gate 753. After synchronism is detected, internally generated G signals are also permitted to pass through gate 751. Thus, in normal opertion a G signal will switch flip-flop 757 to the 1 state, the next incoming B signal will switch it back to the 0 state, and so forth indefinitely. If however, the receiver falls out of step with the transmitter or the received signals are lost through transmission failure or the like, then no further signals will pass through gate 753 and the reversible counter will count only the G signals passing through gate 751. After four failures to receive a properly timed signal at gate 753, gate 766 will detect a coincidence and actuate both the receiver and the transmitter alarms.

Flip-flop 757 and 762 and associated components constitute one form of reversible counter but it will be understood that other forms of reversible electronic or electromechanical counters are known and may be employed equally well, as can analog-type integrators.

It will be understood that the previously described illustrative embodiment is merely that. Numberless variations will occur to those skilled in the art which retain all or most of the advantages of the invention. Only a few of these can be mentioned. Thus, the basic operating speed, line spacing and the ratio of fast to slow scans will depend upon the desired image quality, the capabilities of available components, and the rate of signal transmission attainable with particular modulators, demodulators, and transmission channels. Where transmission channels permit, pulse coding or multilevel coding techniques may be employed to transmit control signals or video. Rotating drum 122 can be replaced by various other known facsimile recording devices. In particular rotating helix recorders and those with endless belt supported stylii are suitable as are cathode ray tube recorders. Where the disadvantages associated with a photosensitive recording medium are acceptable the described facsimile scanner may be employed as a recorder by substituting a variable intensity lamp for the illustrated photomultiplier. Further, the illustrated scanner can be replaced by a known type of cathode ray tube scanner. It is however, necessary that means be available at the scanner and recorder for effecting a controlled incremental advance of the scanning line with respect to the scanned document or the recording medium, and that the scanner have multiple scanning velocities. A multiple line scanner and associated control logic of copending application, Ser. No. 471,874, filed July 14, 1965, may be used instead of some of the components and circuits shown in FIGURES 8 and 9. Also, transmitter and receiver functions can be separated instead of being combined in a transceiver.

Accordingly, the scope of the invention is to be limited only by the following claims:

What is claimed is:

1. In a facsimile system including a facsimile transmitter having means for scanning along a predetermined raster the content of an original document to be transmitted and means for generating video and control signals corresponding to the information content of the original document during operation of the transmitter and additionally including a facsimile receiver having means for recording in response to received video and control signals on a medium thereby generating a facsimile of the original document the improvement comprising:

alarm means for detecting a predetermined malfunction at said receiver or transmitter respectively, and means for signaling the detected malfunction to the other station.

2. In a facsimile system including at least two facsimile transceiver stations one station being designated as a transmitter and the other being designated as a receiver, a receiver alarm system comprising:

first means for detecting termination of transmission from the remote transmitter, second means for detecting the loss of synchronization at said receiver, third means for detecting the lack of further recording capacity at said receiver, fourth means for detecting the impairment of a transmission link coupling the transmitter to said receiver and common means responsive to the actuation of any one of said foregoing means for generating an alarm signal in said transmitter and receiver indicating the actuation of any of said foregoing means.

3. The alarm system defined in claim 2 further including means for maintaining said alarm signal and additionally including manually operable reset means for terminating said alarm signal, operation of said reset means further being operable to reset said receiver to its normal starting condition.

References Cited

UNITED STATES PATENTS

| | | | |
|---|---|---|---|
| 3,006,999 | 10/1961 | Mason | 178—6.6 |
| 3,303,280 | 2/1967 | Fox | 178—6 |

ROBERT L. GRIFFIN, *Primary Examiner.*

HAWORD W. BRITTON, *Assistant Examiner.*

U.S. Cl. X.R.

178—6.6, 69.5; 340—259